United States Patent
Neelakantan et al.

(10) Patent No.: US 8,840,520 B2
(45) Date of Patent: Sep. 23, 2014

(54) METHOD FOR REGULATING GARAGE SHIFTS

(75) Inventors: Vijay A. Neelakantan, Rochester Hills, MI (US); Nathaniel E. Wilke, Waterford, MI (US); Ryan A. Bruss, White Lake, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 0 days.

(21) Appl. No.: 13/453,475

(22) Filed: Apr. 23, 2012

(65) Prior Publication Data

US 2013/0281246 A1    Oct. 24, 2013

(51) Int. Cl.
*F16H 3/66*      (2006.01)

(52) U.S. Cl.
USPC ........................................................ 475/280

(58) Field of Classification Search
USPC ........................................................ 475/280
See application file for complete search history.

(56) References Cited

U.S. PATENT DOCUMENTS

| | | | |
|---|---|---|---|
| 6,176,803 B1 | 1/2001 | Meyer et al. |
| 6,342,026 B1 | 1/2002 | Takagi et al. |
| 6,547,688 B2 | 4/2003 | Takagi et al. |
| 6,558,287 B2 | 5/2003 | Hayabuchi et al. |
| 6,634,980 B1 | 10/2003 | Ziemer |
| 6,663,528 B1 | 12/2003 | Haka |
| 6,736,751 B1 | 5/2004 | Usoro et al. |
| 6,743,139 B1 | 6/2004 | Usoro et al. |
| 6,743,140 B1 | 6/2004 | Lee et al. |
| 6,743,142 B1 | 6/2004 | Lee et al. |
| 6,743,143 B1 | 6/2004 | Usoro et al. |
| 6,743,144 B1 | 6/2004 | Lee et al. |
| 6,746,357 B1 | 6/2004 | Usoro et al. |
| 6,752,736 B1 | 6/2004 | Lee et al. |
| 6,755,765 B2 | 6/2004 | Usoro et al. |
| 6,758,784 B2 | 7/2004 | Lee et al. |
| 6,758,787 B2 | 7/2004 | Usoro et al. |
| 6,764,424 B1 | 7/2004 | Usoro et al. |
| 6,764,425 B2 | 7/2004 | Lee et al. |
| 6,764,426 B2 | 7/2004 | Usoro et al. |
| 6,767,307 B1 | 7/2004 | Lee et al. |
| 6,802,795 B2 | 10/2004 | Miyazaki et al. |
| 6,811,512 B2 | 11/2004 | Usoro et al. |
| 6,837,823 B2 | 1/2005 | Lee et al. |
| 6,852,059 B2 | 2/2005 | Lee et al. |
| 6,960,149 B2 | 11/2005 | Ziemer |

(Continued)

OTHER PUBLICATIONS

U.S. Appl. No. 13/206,862, filed Aug. 11, 2011, by Mellet et al. All pages.

(Continued)

*Primary Examiner* — Jacob S Scott

(57) ABSTRACT

A method is provided for shifting a transmission having an input member, an output member, at least four planetary gear sets, a plurality of coupling members and a plurality of torque transmitting devices. At least one of the torque transmitting devices is a dog clutch or a band clutch. The method includes applying a torque transmitting mechanism to interconnect a first member of a planetary gear set with another member of a planetary gear set or a stationary member. The method also includes applying the dog clutch or band clutch to interconnect a second member of a planetary gear set with another member of a planetary gear set or the stationary member, after the first torque transmitting mechanism is applied. After the dog or band clutch is applied, the torque transmitting mechanism is released.

24 Claims, 12 Drawing Sheets

(56) References Cited

U.S. PATENT DOCUMENTS

| | | |
|---|---|---|
| 6,984,187 B2 | 1/2006 | Biermann |
| 6,991,578 B2 | 1/2006 | Ziemer |
| 7,011,597 B2 | 3/2006 | Haka |
| 7,014,589 B2 | 3/2006 | Stevenson |
| 7,018,319 B2 | 3/2006 | Ziemer |
| 7,101,305 B2 | 9/2006 | Tabata et al. |
| 7,128,683 B2 | 10/2006 | Oguri et al. |
| 7,163,484 B2 | 1/2007 | Klemen |
| 8,202,192 B2 * | 6/2012 | Iizuka et al. ............ 475/280 |
| 8,251,856 B2 * | 8/2012 | Phillips et al. ............ 475/280 |
| 8,409,045 B1 * | 4/2013 | Mellet et al. ............ 475/280 |
| 8,529,395 B2 * | 9/2013 | Wittkopp et al. ............ 475/280 |
| 2002/0098937 A1 * | 7/2002 | Coffey ............ 475/280 |
| 2003/0162624 A1 * | 8/2003 | Kao et al. ............ 475/280 |
| 2005/0090362 A1 | 4/2005 | Abe et al. |
| 2006/0019791 A1 | 1/2006 | Baldwin |
| 2006/0270513 A1 | 11/2006 | Klemen |
| 2006/0270514 A1 | 11/2006 | Oguri et al. |
| 2006/0270516 A1 | 11/2006 | Klemen |
| 2008/0269003 A1 * | 10/2008 | Bauknecht et al. ............ 475/280 |

OTHER PUBLICATIONS

U.S. Appl. No. 61/588,837, filed Jan. 20, 2012, by Singh. All pages.
U.S. Appl. No. 61/602,846, filed Feb. 24, 2012, by Singh. All pages.

* cited by examiner

| GEAR STATE | GEAR RATIO | RATIO STEP | TORQUE TRANSMITTING ELEMENTS | | | | | |
|---|---|---|---|---|---|---|---|---|
| | | | 32 | 30 | 34 | 36 | 28 | 26 |
| REV | -2.870 | | X | | | | | X |
| N | | -0.64 | | | | | | |
| 1ST | 4.455 | | X | | X | | | |
| 2ND | 2.912 | 1.53 | | X | X | | | |
| 3RD | 1.894 | 1.54 | | | X | | | X |
| 4TH | 1.446 | 1.31 | | | X | | X | |
| 5TH | 1.000 | 1.45 | | | | | X | X |
| 6TH | 0.851 | 1.18 | X | | | X | | |
| 7TH | 0.742 | 1.15 | | X | | | X | |
| 8TH | 0.609 | 1.22 | | | | X | X | |
| 9TH | 0.556 | 1.09 | | X | X | | | |
| 10TH | 0.505 | 1.10 | | | | X | | X |

X = ON - ENGAGED CARRYING TORQUE
O = ON - ENGAGED NOT CARRYING TORQUE

| SHIFT (OR) GEAR STATE | ACTIVE CLUTCHES | STEADY STATE APPLIED CLUTCHES |
|---|---|---|
| N | - | 32 |
| N-D | 34, 36 | 32 |
| R-D | 26, 34, 36 | 32 |
| R-D ROLLING GARAGE SHIFT | 26, 34, 36, 30 | 32 |
| D-1ST GEAR - LAUNCH | - | 32, 34 |
| D-1ST GEAR - STEADY STATE | - | 32, 34 |

| SHIFT (OR) GEAR STATE | ACTIVE CLUTCHES | STEADY STATE APPLIED CLUTCHES |
|---|---|---|
| N | 32 | - |
| N-D | 34, 32 | - |
| R-D | 26, 34, 36, 32 | - |
| R-D ROLLING GARAGE SHIFT | 26, 34, 36, 30, 32 | - |
| D-1ST GEAR - LAUNCH | 32 | 34 |
| D-1ST GEAR - STEADY STATE | - | 32, 34 |

| GEAR STATE | GEAR RATIO | RATIO STEP | TORQUE TRANSMITTING ELEMENTS | | | | | | |
|---|---|---|---|---|---|---|---|---|---|
| | | | 134 | 130 | 136 | 132 | 126 | 124 | 128 |
| REV | -3.140 | | X | | | | | X | |
| N | | -0.73 | | | | | | | |
| 1ST | 4.302 | | X | | X | | | | |
| 2ND | 2.964 | 1.45 | | | X | X | | | |
| 3RD | 2.656 | 1.12 | | X | X | | | | |
| 4TH | 2.132 | 1.25 | | | X | | | | X |
| 5TH | 1.743 | 1.22 | | | X | | | X | |
| 6TH | 1.357 | 1.28 | | | X | | X | | |
| 7TH | 1.000 | 1.36 | | | | | X | X | |
| 8TH | 0.758 | 1.32 | | X | | | X | | |
| 9TH | 0.617 | 1.23 | | | | X | X | | |

X = ON - ENGAGED CARRYING TORQUE
O = ON - ENGAGED NOT CARRYING TORQUE

FIG. 8C

| SHIFT (OR) GEAR STATE | ACTIVE CLUTCHES | STEADY STATE APPLIED CLUTCHES |
|---|---|---|
| N | - | 134 |
| N-D | 136, 126 | 134 |
| R-D | 124, 136, 126 | 134 |
| R-D ROLLING GARAGE SHIFT | 124, 136, 126, (132 OR 128) | 134 |
| D-1ST GEAR - LAUNCH | - | 134, 136 |
| D-1ST GEAR - STEADY STATE | - | 134, 136 |

FIG. 9A

| SHIFT (OR) GEAR STATE | ACTIVE CLUTCHES | STEADY STATE APPLIED CLUTCHES |
|---|---|---|
| N | 134 | - |
| N-D | 136, 126, 134 | - |
| R-D | 124, 136, 126, 134 | - |
| R-D ROLLING GARAGE SHIFT | 124, 136, 126, (132 OR 128) 134 | - |
| D-1ST GEAR - LAUNCH | 134 | 136 |
| D-1ST GEAR - STEADY STATE | - | 134, 136 |

| GEAR STATE | GEAR RATIO | RATIO STEP | TORQUE TRANSMITTING ELEMENTS ||||||| 
| | | | 238 | 234 | 236 | 226 | 228 | 232 | 230 |
|---|---|---|---|---|---|---|---|---|---|
| REV | -2.940 | | | | | X | X | | |
| N | | -0.64 | | | | | | | |
| 1ST | 4.585 | | X | | X | | | | |
| 2ND | 2.966 | 1.55 | X | X | | | | | |
| 3RD | 2.624 | 1.13 | X | | | | | X | |
| 4TH | 2.415 | 1.09 | X | | | | | | X |
| 5TH | 1.913 | 1.26 | X | | | X | | | |
| 6TH | 1.446 | 1.32 | X | | | | X | | |
| 7TH | 1.000 | 1.45 | | | | X | X | | |
| 8TH | 0.904 | 1.11 | | | | | X | X | |
| 9TH | 0.746 | 1.21 | | X | | | X | | |
| 10TH | 0.621 | 1.20 | | | | X | | X | |

X = ON - ENGAGED CARRYING TORQUE
O = ON - ENGAGED NOT CARRYING TORQUE

| SHIFT (OR) GEAR STATE | ACTIVE CLUTCHES | STEADY STATE APPLIED CLUTCHES |
|---|---|---|
| N | - | 236 |
| N-D | 238, 228 | 236 |
| R-D | 226, 238, 228 | 236 |
| R-D ROLLING GARAGE SHIFT | 226, 238, 228, (234 OR 230) | 236 |
| D-1ST GEAR - LAUNCH | - | 236, 238 |
| D-1ST GEAR - STEADY STATE | - | 236, 238 |

FIG. 11A

| SHIFT (OR) GEAR STATE | ACTIVE CLUTCHES | STEADY STATE APPLIED CLUTCHES |
|---|---|---|
| N | 236 | - |
| N-D | 238, 228, 236 | - |
| R-D | 226, 238, 228, 236 | - |
| R-D ROLLING GARAGE SHIFT | 226, 238, 228, (234 OR 230), 238 | - |
| D-1ST GEAR - LAUNCH | 236 | 238 |
| D-1ST GEAR - STEADY STATE | - | 236, 238 |

FIG. 11B

METHOD FOR REGULATING GARAGE SHIFTS

FIELD

The invention relates generally to a method of shifting a multiple speed transmission, and more particularly to a method for shifting a transmission having a plurality of planetary gear sets and a plurality of torque transmitting devices, wherein one of the torque transmitting devices is a high gain clutch.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

A dog clutch, band clutch, or other high gain clutch may be used in a transmission when it is desired to limit or eliminate slippage. When disengaged, the spin loss contribution from the dog clutch or band clutch is minimal compared to a multi-plate friction clutch. In addition, some high gain clutches may be desirable because they may occupy less space than a friction clutch.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Though dog clutches, band clutches, or other high gain clutches may occupy less space than a friction clutch, engaging them with spinning members of the transmission may be difficult or accompanied by a rough shift. Accordingly, there is a need for a transmission with efficiency and low packaging space that provides for a smooth shifting.

SUMMARY

A method for shifting a transmission is provided for a transmission of the type having an input member, an output member, at least three planetary gear sets, a plurality of coupling members and a plurality of torque transmitting devices. Each of the planetary gear sets includes first, second and third members. The torque transmitting devices are, for example clutches and brakes. One of the torque transmitting devices is a high gain clutch, such as a dog clutch or a band clutch. The method is provided for engaging the high gain clutch smoothly.

The shifts discussed here include any shift that could be activated by moving the PRNDL shift lever from any state to 'Drive' or 'Reverse' states. This also includes shift by wire transmissions where the shifts could be commanded by the driver from a Park, Neutral, Reverse or Drive State to a Drive or Reverse State.

In one variation, a method for shifting a transmission of a motor vehicle is provided for shifting a transmission having a plurality or group of planetary gear sets, each of the planetary gear sets having first, second, and third members. The method includes a step of applying a torque transmitting mechanism to interconnect a first member of a group of planetary gear sets with another member of the group of planetary gear sets or a stationary member. The method also includes a step of applying a high gain clutch to interconnect a second member of the group of planetary gear sets with another member of the group of planetary gear sets or the stationary member, which includes applying the high gain clutch while the torque transmitting mechanism is applied. The high gain clutch may be a dog clutch or a band clutch, for example. The method includes a step of releasing the torque transmitting mechanism while the high gain clutch is applied.

In another variation, which can be combined with or separate from the other variations described herein, a method for shifting a transmission having a plurality or group of planetary gear sets is provided. Each of the planetary gear sets has first, second, and third members. The method includes a step of applying a torque transmitting mechanism to interconnect a first member of the group of planetary gear sets with another member of the group of planetary gear sets or a stationary member. The method also includes a step of determining the actual speed of a second member of the group of planetary gear sets. Further, the method includes a step of comparing the actual speed of the second member to a predetermined upper threshold. If the actual speed of the second member exceeds the predetermined upper threshold, the method includes adjusting fluid pressure applied to the torque transmitting mechanism. The method includes repeating the step of determining the actual speed of the second member, the step of comparing the actual speed of the second member to the predetermined upper threshold, and the step of adjusting the fluid pressure applied to the torque transmitting mechanism until the actual speed of the second member drops below or equals the predetermined upper threshold. If the actual speed of the second member is less than or equal to the predetermined upper threshold, the method includes a step of applying a high gain clutch, such as a dog clutch or a band clutch, to interconnect the second member with another member of the group of planetary gear sets or the stationary member while the torque transmitting mechanism is applied. The method also includes a step of releasing the torque transmitting mechanism after the high gain clutch is applied.

This invention also includes different methods of executing the intended shifts depending upon if the vehicle is stationary or rolling at slow speeds or if there is a torque converter or fluid coupling between the engine and the transmission or if the vehicle is launched using a friction clutch.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 8C is a truth table presenting the state of engagement of the various torque transmitting elements in each of the available forward and reverse speeds or gear ratios of the transmissions illustrated in FIGS. 8A-8B;

FIG. 9A is a shift diagram illustrating an embodiment of a method of shifting the transmission of FIGS. 8A-8B when the input is connected to a torque converter, in accordance with the principles of the present invention;

Figures 9B, 10A:
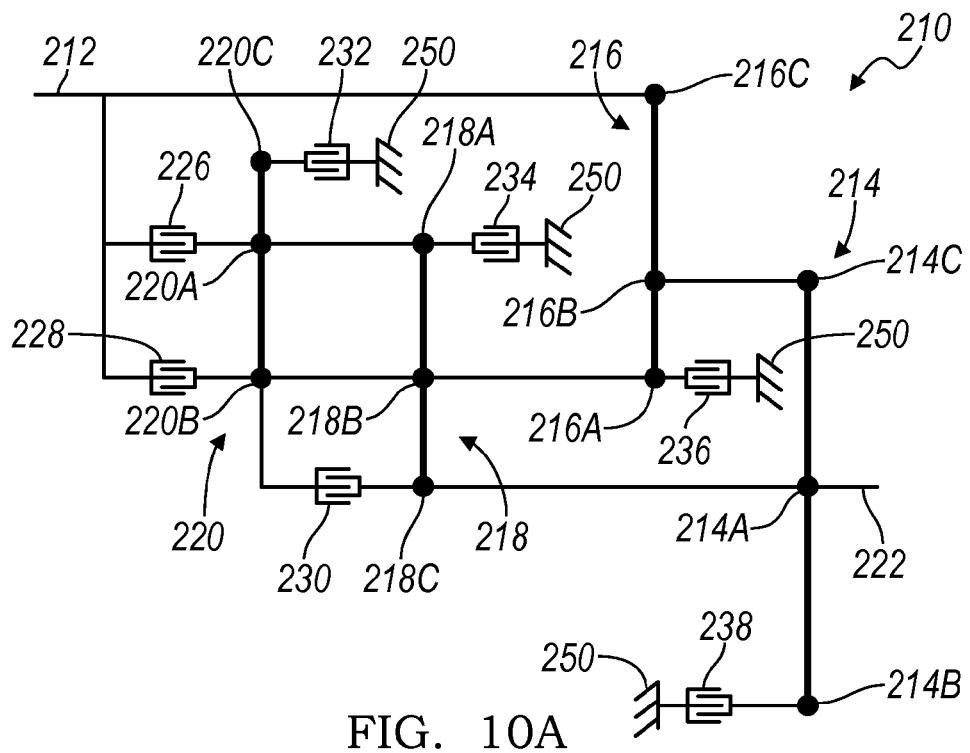
FIG. 9B is a shift diagram illustrating an embodiment of a method of shifting the transmission of FIGS. 8A-8B when the input is connected directly to an engine or motor without a torque converter, in accordance with the principles of the present invention.
FIG. 10A is a lever diagram of a ten speed transmission utilized for an embodiment of the method according to the present invention.
Figures 10B, 10C:
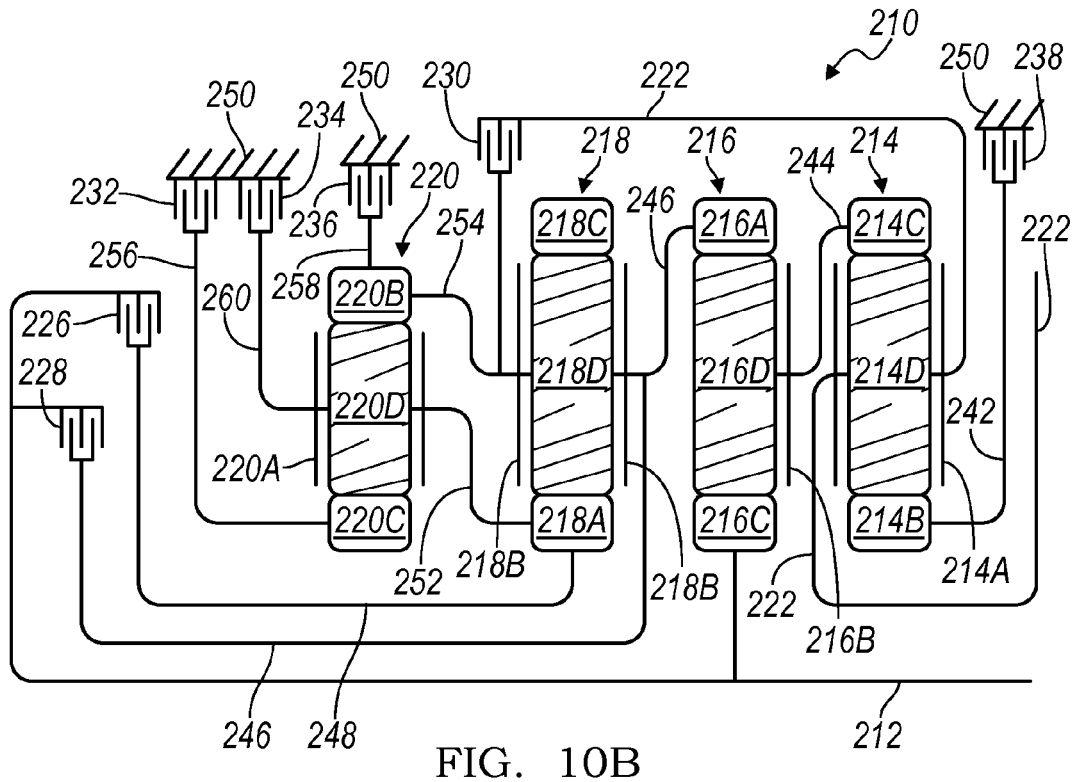
FIG. 10B is a diagrammatic illustration of a ten speed transmission utilized for an embodiment of the method according to the present invention.
FIG. 10C is a truth table presenting the state of engagement of the various torque transmitting elements in each of the available forward and reverse speeds or gear ratios of the transmissions illustrated in FIGS. 10A-10B.

FIG. 11A is a shift diagram illustrating a method of shifting the transmission of FIGS. 10A-10C when the input is connected to a torque converter, in accordance with the principles of the present invention; and FIG. 11B is a shift diagram illustrating a method of shifting the transmission of FIGS. 10A-10C when the input is connected directly to an engine or motor without a torque converter, in accordance with the principles of the present invention.

DETAILED DESCRIPTION

The following description is merely exemplary in nature and is not intended to limit the present disclosure, application, or uses.

In some forms of the present disclosure, a nine or ten speed transmission is provided in a relatively small package by achieving nine or ten forward speeds with four planetary gear sets, four brakes, and three clutches. In other variations, however, additional brakes, clutches, planetary gear sets, or other components may be added and this invention may be used in transmissions with lower or higher number of gear states as garage shifts could be independent of the number of gear states present in the transmission.

The nine or ten speed automatic transmissions illustrated herein have an arrangement of permanent mechanical connections between the elements of the four planetary gear sets. As used herein, coupling or interconnection refers to a direct, continuous, and permanent coupling or interconnection, for example by a rigid member or shaft, between elements. Selective coupling or interconnection, on the other hand, refers to a selective coupling by a clutch or brake, where the clutch or brake can be engaged and disengaged, such that when engaged, the selectively coupled or interconnected elements rotate together, but when disengaged, the selectively coupled or interconnected elements are free to rotate independently.

Figure 1A:
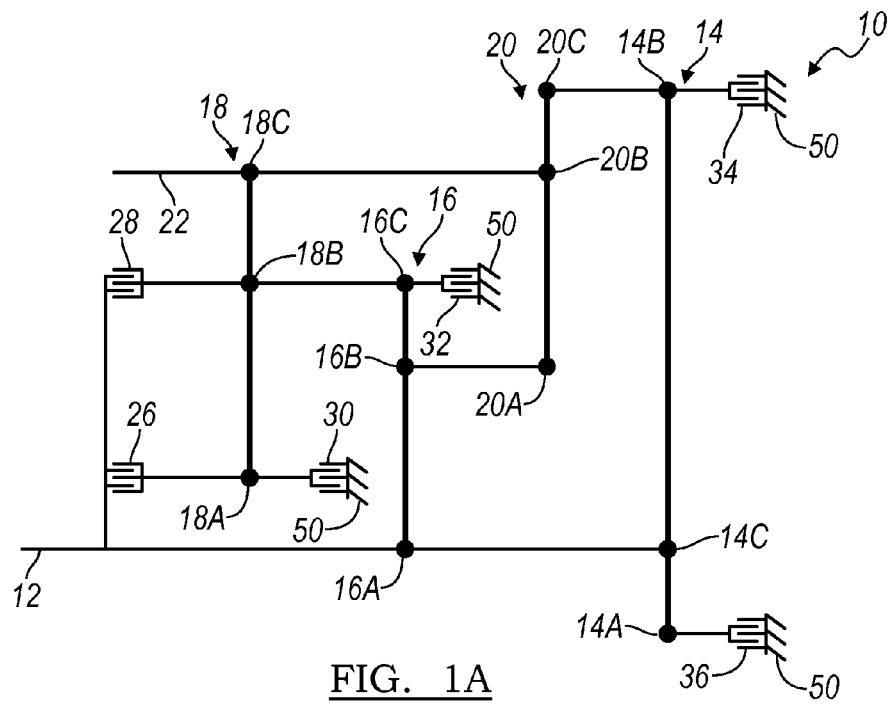
FIG. 1A is a lever diagram of a ten speed transmission utilized for an embodiment of the method according to the present invention.

Referring now to FIG. 1A, an embodiment of a ten speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18, a fourth planetary gear set 20, and an output shaft or member 22. In the lever diagram of FIG. 1A, the first planetary gear set 14 has three nodes: a first node 14A, a second node 14B, and a third node 14C. The second planetary gear set 16 has three nodes: a first node 16A, a second node 16B, and a third node 16C. The third planetary gear set 18 has three nodes: a first node 18A, a second node 18B, and a third node 18C. The fourth planetary gear set 20 has three nodes: a first node 20A, a second node 20B, and a third node 20C.

The input member 12 is continuously coupled to the first node 16A of the second planetary gear set 16 and the third node 14C of the first planetary gear set 14. The output member 22 is continuously coupled to the third node 18C of the third planetary gear set 18 and the second node 20B of the fourth planetary gear set 14. The first node 20A of the fourth planetary gear set 20 is coupled to the second node 16B of the second planetary gear set 16. The second node 20B of the fourth planetary gear set 20 is coupled to the third node 18C of the third planetary gear set 18. The third node 20C of the fourth planetary gear set 20 is coupled to the second node 14B of the first planetary gear set 14. The third node 16C of the second planetary gear set 16 is coupled to second node 18B of the third planetary gear set 18.

A first torque transmitting device, such as first brake 36, selectively connects the first node 14A of the first planetary gear set 14 with the stationary member or transmission housing 50. A second brake 34 selectively connects the third node 20C of the fourth planetary gear set 20 and the second node 14B of the first planetary gear set 14 with the stationary member or transmission housing 50.

The second brake 34 is a high gain clutch, such as a dog clutch or a band clutch. For example, the second brake 34 may exhibit a high torque even with a low pressure applied to it. The high gain clutch 34 may be capable of carrying high levels of torque after full engagement. An example of a high gain clutch 34 includes a dog clutch having near, or negligible, zero spin losses. The dog clutch may have teeth with grooves formed therein that are selectively engageable with a second set of grooves formed in another set of teeth on the surface of the stationary member 50, however, the dog clutch may have any other suitable shape. Thus, the dog clutch may have two halves having opposed teeth and grooves, one half which is connected to the stationary member 50 or another member, and the other half which is connected to a shaft 42. The dog clutch engages, not by friction, but by interference and meshing of the teeth and grooves of the halves of the dog clutch. In another variation, the high gain clutch 34 may be a band clutch having a friction band or non-friction band that tightens around a shaft or drum, by way of example.

A first clutch 26 selectively connects the input member or shaft 12, the first node 16A of the second planetary gear set 16, and the third node 14C of the first planetary gear set 14 with the first node 18A of the third planetary gear set 18. A second clutch 28 selectively connects the input member or shaft 12, the first node 16A of the second planetary gear set 16, and the third node 14C of the first planetary gear set 14 with the second node 18B of the third planetary gear set 18 and the third node 16C of the second planetary gear set 16.

A third brake 30 selectively connects the first node 18A of the third planetary gear set 18 with a stationary member or transmission housing 50. A fourth brake 32 selectively connects the third node 16C of the second planetary gear set 16 and the second node 18B of the third planetary gear set 18 with the stationary member or transmission housing 50.

The first and second clutches 26, 28, and the first, third, and fourth brakes 36, 30, 32, may be friction disc clutches, for example, a plurality of interleaved friction and/or non-friction discs in a clutch pack. The friction clutches may have slippage when applied, providing for a smooth shifting transition.

Figure 1B:
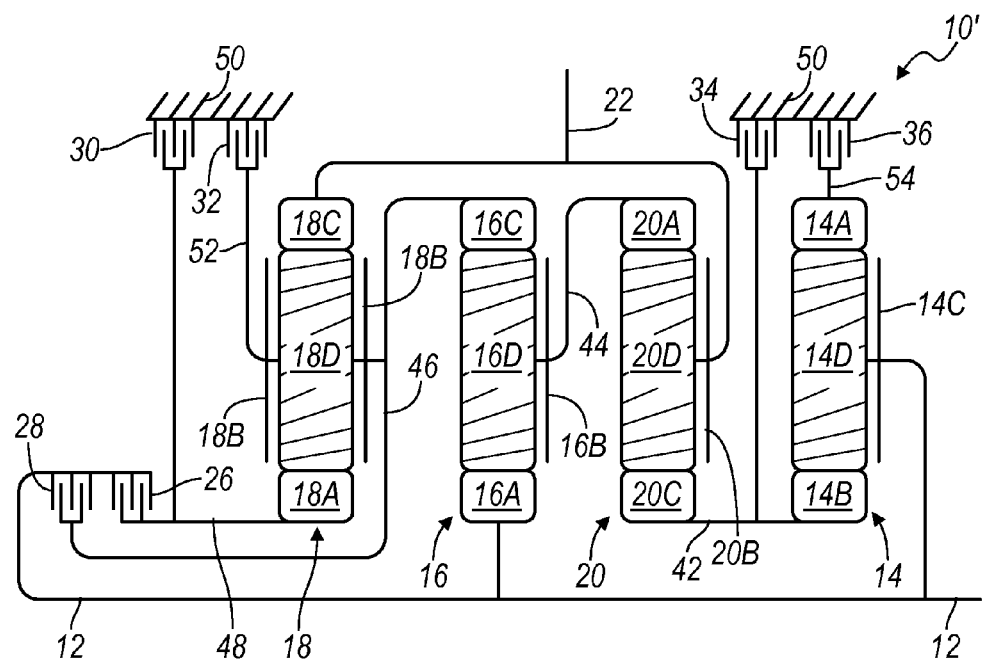
FIG. 1B is a diagrammatic illustration of a ten speed transmission utilized for an embodiment of the method according to the present invention.

Referring now to FIG. 1B, a stick diagram presents a schematic layout of an embodiment of the ten speed transmission 10' according to the present invention. In FIG. 1B, the numbering from the lever diagram of FIG. 1A is carried over. The clutches and couplings are correspondingly presented whereas the nodes of the planetary gear sets now appear as components of planetary gear sets such as sun gears, ring gears, planet gears and planet gear carriers. FIG. 1B is one possible embodiment of transmission illustrated in the lever diagram of FIG. 1A.

For example, the planetary gear set 20 includes a sun gear member 20C, a ring gear member 20A, and a planet gear carrier member 20B that rotatably supports a set of planet gears 20D (only one of which is shown). The fourth planetary gear set 20 is a simple planetary gear set in this variation, but in other variations of the present invention, the fourth planetary gear set 20 could be a compound planetary gear set. The sun gear member 20C is connected for common rotation with a first shaft or interconnecting member 42. The ring gear member 20A is connected for common rotation with a second shaft or interconnecting member 44. The planet carrier member 20B is connected for common rotation with the output shaft or member 22. The planet gears 20D are each configured to intermesh with both the sun gear member 20C and the ring gear member 20A, in this embodiment.

The planetary gear set 16 includes a sun gear member 16A, a ring gear member 16C, and a planet gear carrier member 16B that rotatably supports a set of planet gears 16D (only one of which is shown). The second planetary gear set 16 is a simple planetary gear set in this variation, but in other variations of the present invention, the second planetary gear set 16 could be a compound planetary gear set. The sun gear member 16A is connected for common rotation with the input shaft or member 12. The ring gear member 16C is connected for common rotation with a third shaft or interconnecting member 46. The planet carrier member 16B is connected for common rotation with the second shaft or interconnecting member 44. The planet gears 16D are each configured to intermesh with both the sun gear member 16A and the ring gear member 16C, in this embodiment.

The planetary gear set 18 includes a sun gear member 18A, a ring gear member 18C, and a planet gear carrier member 18B that rotatably supports a set of planet gears 18D (only one of which is shown). The third planetary gear set 18 is a simple planetary gear set in this variation, but in other variations of the present invention, the third planetary gear set 18 could be a compound planetary gear set. The sun gear member 18A is connected for common rotation with a fourth shaft or interconnecting member 48. The ring gear member 18C is connected for common rotation with the output shaft or member 22. The planet carrier member 18B is connected for common rotation with the third shaft or interconnecting member 46 and a fifth shaft or interconnecting member 52. The planet gears 18D are each configured to intermesh with both the sun gear member 18A and the ring gear member 18C, in this variation.

The planetary gear set 14 includes a sun gear member 14B, a ring gear member 14A and a planet gear carrier member 14C that rotatably supports a set of planet gears 14D (only one of which is shown). The first planetary gear set 14 is a simple planetary gear set in this variation, but in other variations of the present invention, the first planetary gear set 14 could be a compound planetary gear set. The sun gear member 14B is connected for common rotation with the first shaft or interconnecting member 42. The ring gear member 14A is connected for common rotation with a sixth shaft or interconnecting member 54. The planet carrier member 14C is connected for common rotation with the input shaft or member 12. The planet gears 14D are each configured to intermesh with both the sun gear member 14B and the ring gear member 14A, in this embodiment.

The input shaft or member 12 is continuously connected to an engine (not shown), to a turbine of a torque converter (not shown), or to an electric motor (not shown). The output shaft or member 22 is continuously connected with the final drive unit or transfer case (not shown).

The torque-transmitting mechanisms or clutches 26, 28 and brakes 30, 32, 34 and 36 allow for selective interconnection of the shafts or interconnecting members, members of the planetary gear sets, and the transmission housing. For example, the first clutch 26 is selectively engageable to connect the input shaft or member 12 with the fourth shaft or interconnecting member 48. The second clutch 28 is selectively engageable to connect the input shaft or member 12 with the third shaft or interconnecting member 46.

The third brake 30 is selectively engageable to connect the fourth shaft or interconnecting member 48 with the stationary element or the transmission housing 50 in order to restrict the member 48 from rotating relative to the transmission housing 50. The fourth brake 32 is selectively engageable to connect the fifth shaft or interconnecting member 52 with the stationary element or the transmission housing 50 in order to restrict the member 52 from rotating relative to the transmission housing 50. The second brake 34, which is a high gain clutch such as a dog clutch or band clutch, is selectively engageable to connect the first shaft or interconnecting member 42 with the stationary element or the transmission housing 50 in order to restrict the member 42 from rotating relative to the transmission housing 50. The first brake 36 is selectively engageable to connect the sixth shaft or interconnecting member 54 with the stationary element or the transmission housing 50 in order to restrict the member 54 from rotating relative to the transmission housing 50.

Figures 1C, 2A:
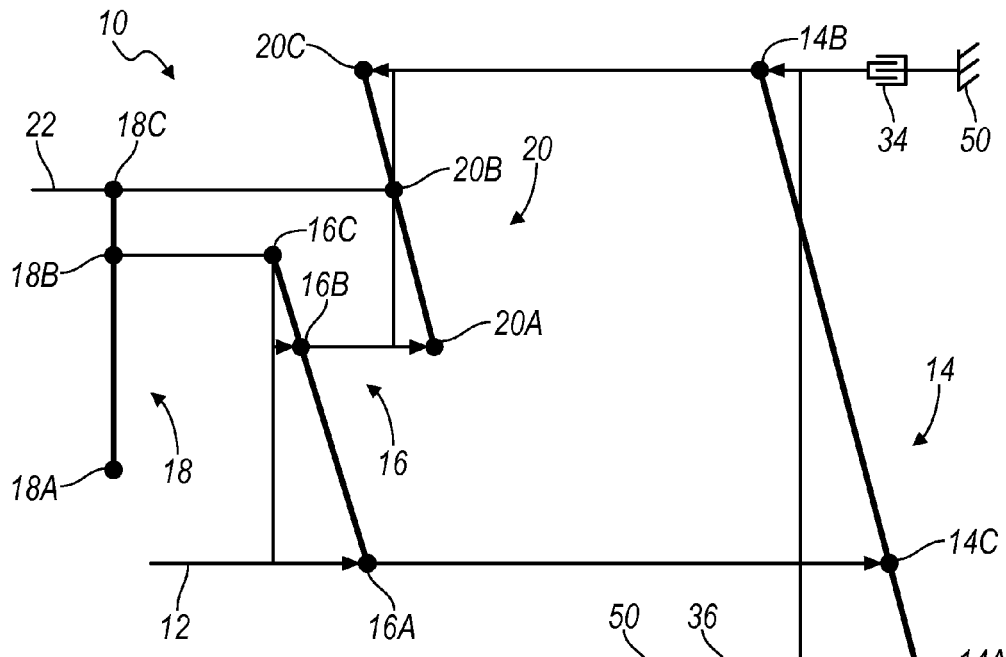
FIG. 1C is a truth table presenting the state of engagement of the various torque transmitting elements in each of the available forward and reverse speeds or gear ratios of the transmissions illustrated in FIGS. 1-2.
FIG. 2A is a lever diagram of the transmission of FIG. 1A, showing the transmission of FIG. 1A operating in neutral, according to the principles of the present invention.

Referring now to FIGS. 1B and 1C, the operation of the ten speed transmission 10' will be described. It will be appreciated that transmission 10' is capable of transmitting torque from the input shaft or member 12 to the output shaft or member 22 in at least ten forward speed torque ratios and at least one reverse speed or torque ratio. Each forward and reverse speed or torque ratio is attained by engagement of one or more of the torque-transmitting mechanisms (i.e. first clutch 26, second clutch 28, first brake 36, second brake 34, third brake 30, and fourth brake 32), as will be explained below.

FIG. 1C is a truth table presenting the various combinations of torque-transmitting mechanisms that are activated or engaged to achieve the various gear states. An "X" in the box means that the particular clutch or brake is engaged to achieve the desired gear state. An "O" represents that the particular torque transmitting device (i.e. a brake or clutch) is on or active, but not carrying torque. No "O"'s are used in FIG. 1C. Actual numerical gear ratios of the various gear states are also presented although it should be appreciated that these numerical values are exemplary only and that they may be adjusted over significant ranges to accommodate various applications and operational criteria of the transmission 10'. Of course, other gear ratios are achievable depending on the gear diameter, gear teeth count and gear configuration selected.

For example to establish a reverse gear, first clutch 26 and fourth brake 32 are engaged or activated. The first clutch 26 connects the input shaft or member 12 with the fourth shaft or interconnecting member 48. The fourth brake 32 connects the fifth shaft or interconnecting member 52 with the stationary element or the transmission housing 50 in order to restrict the member 52 from rotating relative to the transmission housing 50. Likewise, the ten forward ratios are achieved through different combinations of clutch and brake engagement, as shown in FIG. 1C.

It will be appreciated that the foregoing explanation of operation and gear states of the ten speed transmission 10' assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIGS. 2A, 2B, 3, and 4, a method of operating the transmission 10' will be described. FIG. 2A illustrates the lever diagram of the transmission 10 or 10' when the vehicle engine or electric motor is on. In this embodiment, FIG. 2A illustrates a transmission for a powertrain having a torque converter. As such, the input member 12 receives torque from the engine or motor through the torque converter, and translates torque throughout the gear sets 14, 16, 18, 20 of the transmission 10, 10'. The angular displacement of the levers from their vertical positions indicates motion of the nodes that are displaced from the vertical lines associated with each lever. Nodes to the left of the vertical line associated with their levers are spinning in a negative direction, and nodes to the right of the vertical line associated with their levers are spinning in a positive direction.

In FIG. 2A, the vehicle is in neutral. As shown in FIG. 2A, the following nodes experience motion when the vehicle is turned on and in neutral: 14A, 14B, 14C, 20A, 20C, 16A, and 16B, as each of these nodes is displaced from the vertical line associated with its lever. More specifically, nodes 14A, 14C, 20A, 16A, and 16B are spinning in a positive direction; and nodes 14B and 20C are spinning in a negative direction. As the vehicle is in neutral, the output shaft 22 is not spinning, and likewise, nodes 18A, 18B, 18C, 16C, and 20B are not spinning in neutral. The fourth brake 32 may be applied in a steady state manner throughout reverse, drive, and neutral, to brake nodes 18B and 16C, in some embodiments.

As explained above with respect to the high gain clutch 34, it may be desirable to engage the high gain clutch 34 at a zero or low spin speed, in order to engage the opposed surfaces (if a dog clutch) of the high gain clutch 34, and/or to engage the high gain clutch 34 without an abrupt feeling of heavy shifting that would be apparent to vehicle occupants. Accordingly, it may be desirable to slow down or stop the node 14B on which the high gain clutch 34 acts before applying the high gain clutch 34.

Figure 4:
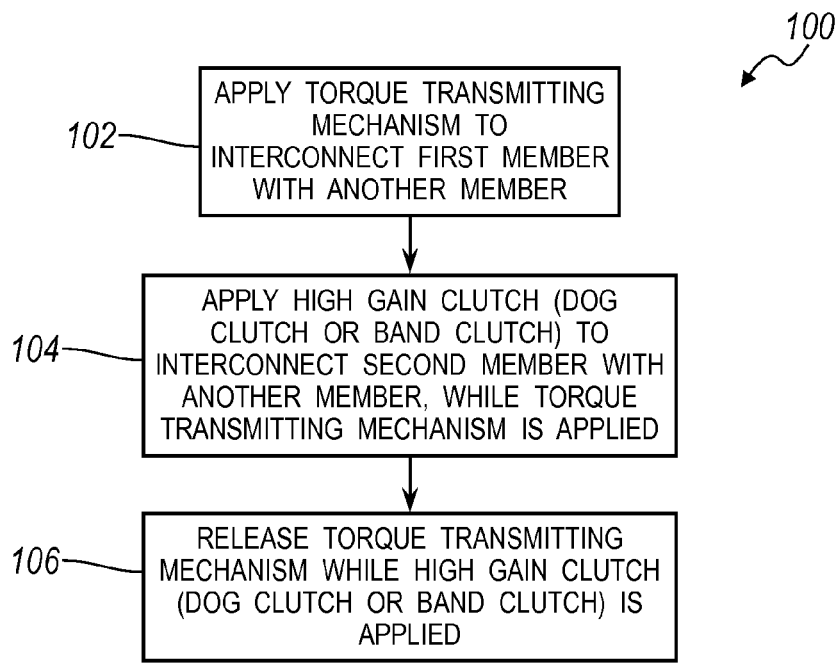
FIG. 4 is a block diagram illustrating an embodiment of a method in accordance with the principles of the present invention.

Therefore, a method 100 for shifting a transmission, for example, transmission 10, of a motor vehicle is shown in FIG. 4. The method 100 may be used with the transmissions 10, 10' described above or with another transmission. For ease of reference, the method 100 will first be described for use with the transmission 10. The method 100 includes a step 102 of applying a torque transmitting device, such as a first brake 36, to interconnect a first member with another member of the plurality of planetary gear sets. Therefore, in the transmission 10, the method 100 can be implemented by applying the first brake 36 to the first node 14A of the first planetary gear set 14.

Figures 2B, 3:
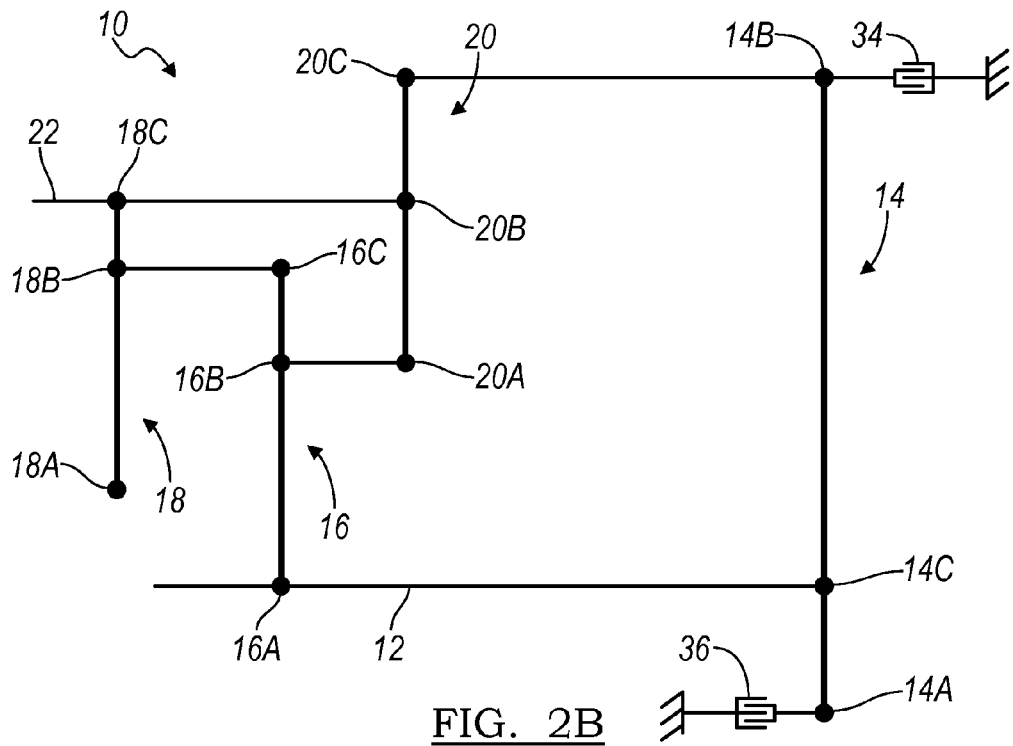
FIG. 2B is a lever diagram of the transmission of FIGS. 1A and 2A, showing the application of an embodiment of the method in accordance with the principles of the present invention.
FIG. 3 is a shift diagram illustrating an embodiment of a method of shifting the transmission of FIGS. 1A-1B when the input is connected to a torque converter, in accordance with the principles of the present invention.

As shown in FIG. 2B, when the first brake 36 is applied, the first node 14A stops spinning, and the other nodes 14C, 14B of the first lever also stop spinning. Therefore, the second node 14B is stopped, in other words, the slip speed across the oncoming high gain clutch 34 is zero or negligible, and the high gain clutch 34 (which may be a dog clutch or a band clutch) can be easily and smoothly applied to the zero speed or very low speed node 14B. Thus, the method 100 includes a step 104 of applying the high gain clutch 34 to interconnect the second member 14B of the first planetary gear set 14 with the stationary member 50 while the first brake 36 is applied. The input member 12 is also stopped by applying the first brake 36 in neutral, as the third node 14C is connected thereto.

In this embodiment, and in other embodiments described herein, the torque transmitting devices may have pressure applied to them without fully engaging them, to implement the method 100 of the present disclosure. For example, in some variations, the first brake 36 may have pressure applied to it to partially, but not fully, engage the first brake 36, thereby slowing down the node 14A, but allowing some slippage. In such case, the second node 14B will be slowed down, but not necessarily stopped completely. In other embodiments, the first brake 36 can be fully engaged and locked before the second brake 34 is applied.

In the embodiment of FIG. 1B, the first node 14A is the ring gear member 14A, the second node 14B is the sun gear member 14B, and the third node 14C is the planetary gear carrier member 14C. As such, the first brake 36 is applied to the ring gear member 14A to stop the nodes 14A, 14B, 14C of the first planetary gear set 14, and then the second brake 34 (which is a high gain clutch, such as a dog clutch or a band clutch) can be smoothly applied to the sun gear member 14B.

Referring to FIG. 1C, the first brake 36 is not typically applied in the neutral, first gear, or reverse gear ratios. Accordingly, after the high gain clutch 34 is applied, the method 100 includes a step 106 of releasing the torque transmitting mechanism that was first applied. In this embodiment, the step 106 includes releasing the first brake 36 after the high gain clutch 34, i.e., the second brake 34, is applied.

Referring now to FIG. 3, a shift diagram illustrates applications of the method 100 to the transmission 10 connected to a torque converter. To shift from neutral to drive, the first brake 36 may be applied and then the second brake 34 is applied, as explained above. The first brake 36 may be fully engaged, or it may merely have pressure applied to it such that it is partially engaged and slipping. In other words, the first brake 36 may be applied, but not fully engaged or locked; but in other variations, it may be applied fully and locked.

Figure 5A:
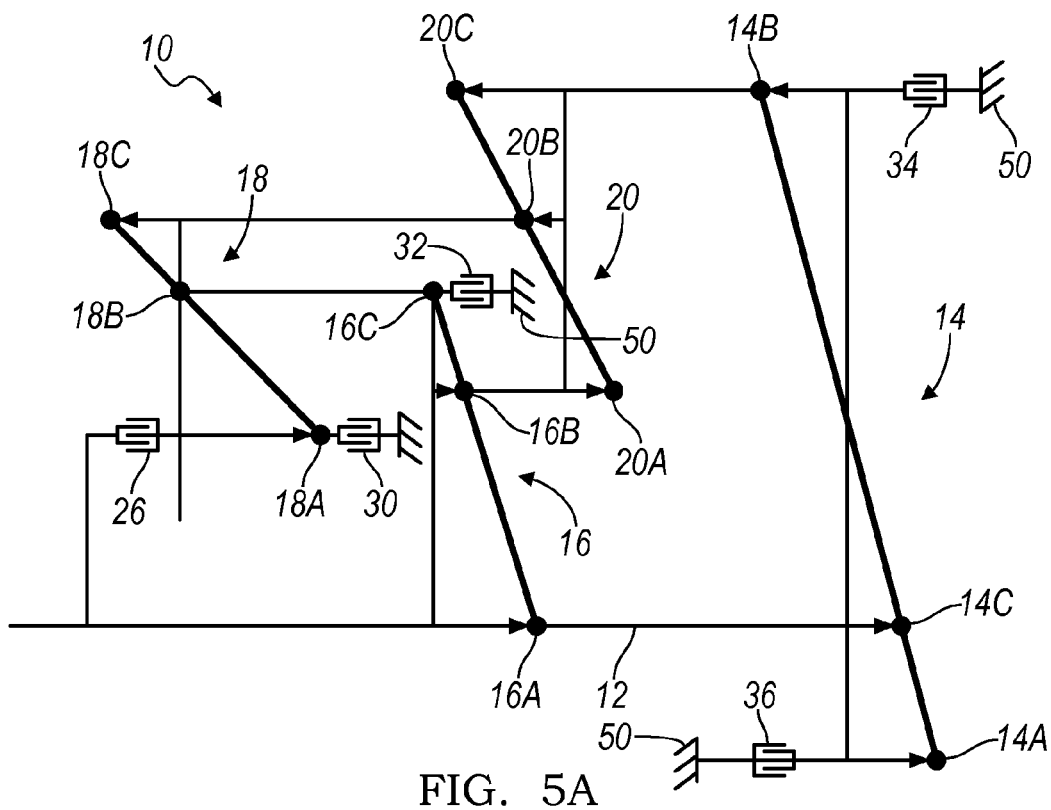
FIG. 5A is a lever diagram of the transmission of FIG. 1A, showing the transmission of FIG. 1A rolling in reverse, according to the principles of the present invention.
Figures 5B, 6:
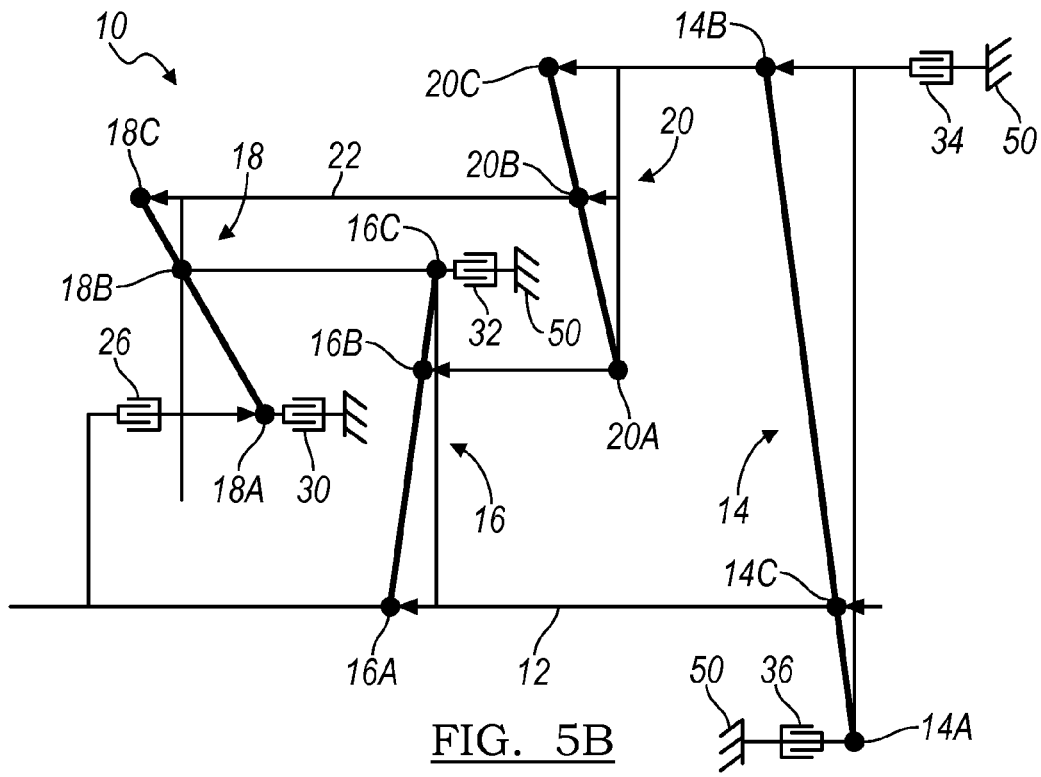
FIG. 5B is a lever diagram of the transmission of FIGS. 1A and 5A, showing a partial application of an embodiment of the method in accordance with the principles of the present invention.
FIG. 6 is a shift diagram illustrating an embodiment of a method of shifting the transmission of FIGS. 1A-1B when the input is connected directly to an engine or motor without a torque converter, in accordance with the principles of the present invention.

Referring now to FIGS. 5A-5B, for a rolling garage shift, when the transmission is rolling in the reverse gear speed ratio, a driver puts the transmission 10 in drive so that the transmission 10 must change to first gear. In this case, the method 100 includes another step of applying the third brake 30 prior to applying the second brake 34 having the high gain clutch. This is because in the reverse gear speed ratio, the output 22 is spinning and therefore, the nodes 18C and 20B connected to the output 22 are spinning. Applying a brake to the first member 18A of the third planetary gear set, along with the other brakes applied, aids in reducing the slip speed of the second node 14B of the first planetary gear set 14, which is desirable before engaging the second brake 34 (which is a dog clutch or band clutch). After the second brake 34 is applied, the method 100 may include a step of releasing the third brake 30.

The fourth brake 32 may be applied in a steady state manner throughout the neutral, reverse, and first gear ratios, in this torque converter application, for example. In other words, the fourth brake 32 is applied to the second node 18B of the third planetary gear set 18 and the third node 16C of the second planetary gear set 16. Accordingly, the fourth brake 32 remains engaged throughout reverse, neutral, and first gears. In other words, the fourth brake 32 remains applied during the steps of applying the first, second, and third brakes 36, 34, 30 and the steps of releasing the first and third brakes 36, 30. Therefore, when the third brake 30 is applied, the result is that the output member 22 will stop spinning because the third node 18C is connected to the output member 22, and the other two nodes 18A, 18B of the third planetary gear set 18 are stopped by the third and fourth brakes 30, 32.

For example, referring to FIG. 5A, the output 22 is shown spinning in the reverse direction. Accordingly, FIG. 5A illustrates the motion of the nodes of the levers when moving in a reverse direction, prior to shifting into drive. Both the input 12 and the output 22 are spinning, as are the nodes 18A, 18C, 16A, 16B, 20A, 20B, 20C, 14A, 14B, and 14C. More specifically, the nodes 18C, 20B, 20C, and 14B are spinning in the negative direction and the nodes 18A, 16A, 16B, 20A, 14A, and 14C are spinning in a positive direction.

Referring to FIG. 5B, the step 102 is executed to apply the first brake 36, which stops the first node 14A (or first member) of the first planetary gear set 14 from spinning. The fourth brake 32 is also applied as a steady state brake in FIG. 5B, which stops the nodes 18B and 16C from spinning. This does not, however, result in stopping the second member 14B of the first planetary gear set 14 from spinning. As stated above, the goal for engaging the high gain clutch 34 is to have the second member 14B at zero speed, negligible speed, or a low speed. As shown in FIG. 5B, engaging the first brake 36 had the effect of slowing down the second member 14B (as compared to FIG. 5A, where the arrow from the vertical line to the lever for the first planetary gear set 14 is shorter in FIG. 5B as compared to the same arrow in FIG. 5A, indicating that the second member 14B is spinning at a slower rate after application of the first brake 36). However, the second member 14B still spins at a speed that is higher than desirable for activating the high gain clutch 34, because a "hard shift" (though not as hard) would result if only the first brake 36 is applied before applying the high gain clutch 34. In some variations of the present disclosure, a slightly less hard shift will be acceptable, and this constitutes a variation of the present disclosure.

However, in other variations, it may be desirable to slow the second member 14B down further, to zero or near zero slip speed, before applying the high gain clutch 34. Therefore, in addition to applying the first brake 36, and while the fourth brake 32 is applied in a steady state, the third brake 30 is also applied. The third brake 30 stops the first node 18A of the third planetary gear set 18 from spinning. As such, since the fourth brake 32 is also applied as a steady state clutch as shown in FIG. 5B, two out of the three nodes of the third planetary gear set 18 are braked (18A and 18B). Because the first two nodes 18A, 18B of the third planetary gear set 18 are braked, the third node 18C of the third planetary gear set 18 will also stop spinning. Since the third node 18C is connected for common rotation with the output member 22, the result is that the output member 22 will also stop spinning. Essentially, the vehicle can be stopped by applying the fourth brake 32 to the second node 18B of the third planetary gear set 18 and applying the third brake 30 to the first node 18A of the third planetary gear set. With the output member 22 at zero (or near zero) speed, then the first brake 36 is effective in stopping the second member 14B from spinning, as explained and illustrated above with respect to FIGS. 2A and 2B.

FIG. 3 also shows that the first clutch 26 is applied when shifting from reverse to drive. This is because, in accordance with the truth table in FIG. 1C, the first clutch 26 is engaged while the transmission 10 is in a reverse gear ratio.

In another variation, instead of or in addition to applying the third brake 30 when executing a rolling garage shift from reverse to drive, the vehicle may simply be braked via the vehicle braking system prior to applying the second brake (high gain clutch) 34. For example, a vehicle brake command may be sent to stop the vehicle from rolling in reverse after the reverse-to-drive shift command is received. In such a scenario, the third node 18C of the third planetary gear set 18 is essentially braked from output shaft 22 due to the vehicle brakes being applied. Therefore, in this variation, the first brake 36 is applied and the vehicle is braked via the braking system. The fourth brake 32 may also be constantly applied, as explained above. The result is that the slip speed across the second node 14B of the first planetary gear set 14 is zero or negligible, and the high gain clutch (second brake 34) can then be applied smoothly. In order to accomplish this variation without user intervention, the method 100 could include sending a signal to the vehicle braking system to cause the vehicle to automatically brake the motor vehicle, such as through the vehicle traction control system. Accordingly, a driver can be rolling in reverse, and then put the vehicle in drive, and the high gain clutch 34 will be applied smoothly and with little or no noticeable shifting effect to the driver.

In yet another variation, the torque converter is omitted and one of the torque transmitting mechanisms is used to launch the vehicle. With reference to FIG. 6, a shift diagram illustrates the various torque transmitting mechanisms that are applied in an active or steady state manner in different shift scenarios. In the embodiment of FIG. 6, the fourth brake 32 is used to launch the vehicle using the transmission 10. The fourth brake 32 is applied in neutral and in drive, the high gain clutch 34 is applied.

When executing a garage shift in which the vehicle is either stopped in reverse gear or rolling in reverse, and in which the driver puts the vehicle in drive, a "hard shift" may result from applying the high gain clutch 34, if the high gain clutch 34 is applied with the fourth brake 32 only. Therefore, the method 100 is used, wherein the first brake 36 is applied (step 102) before applying the second brake 34 (step 104), and then the first brake 36 is released after the second brake 34 is applied (step 106). Each torque transmitting device may be partially engaged, by having fluid applied to them without fully engaging and locking them; or in other embodiments, the torque transmitting devices may be fully engaged.

However, additional steps of the method 100 may be used for a transmission 10 that is not coupled to a torque converter and is instead coupled directly to a motor or engine output shaft, when shifting from reverse or rolling reverse to drive. This is because applying the first brake 36 will not have the effect of stopping the third node 14C or the second node 14B of the first planetary gear set 14 from spinning, as the input member 12 cannot be stopped (without stalling the motor/engine). Therefore, with no torque converter, the input 12 will need to remain in motion along with a motor or engine output.

Figure 7A:
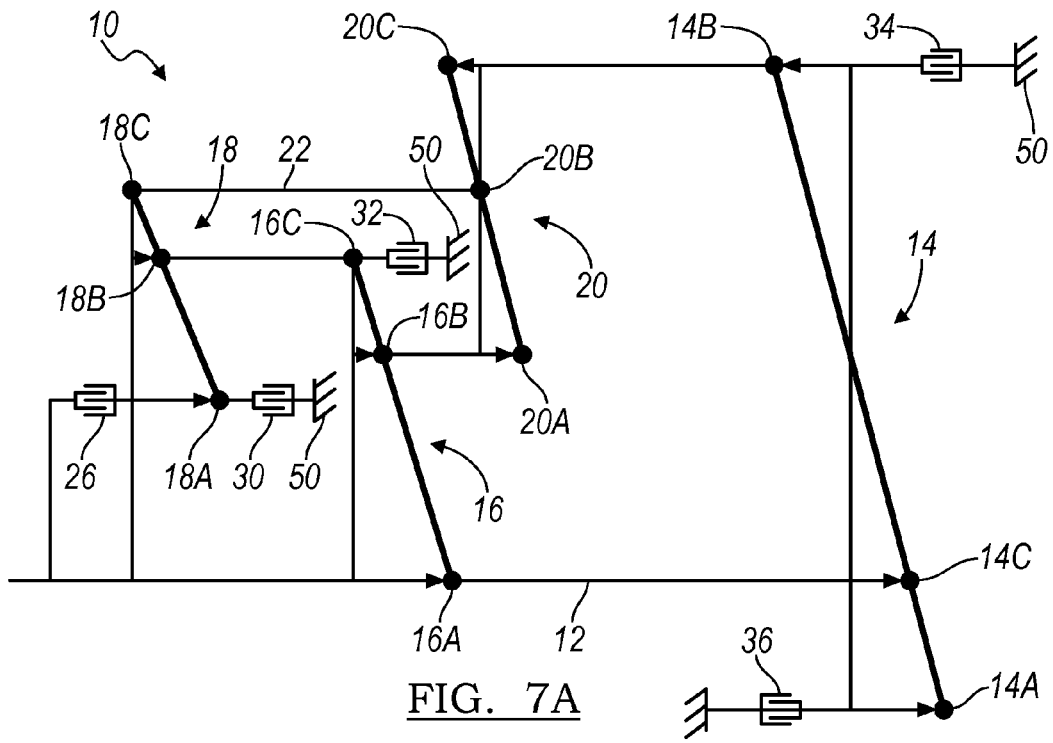
FIG. 7A is a lever diagram of the transmission of FIG. 1A, wherein the transmission of FIG. 1A is operating in neutral and is directly connected to an engine or motor without a torque converter, according to the principles of the present invention.
Figure 7B:
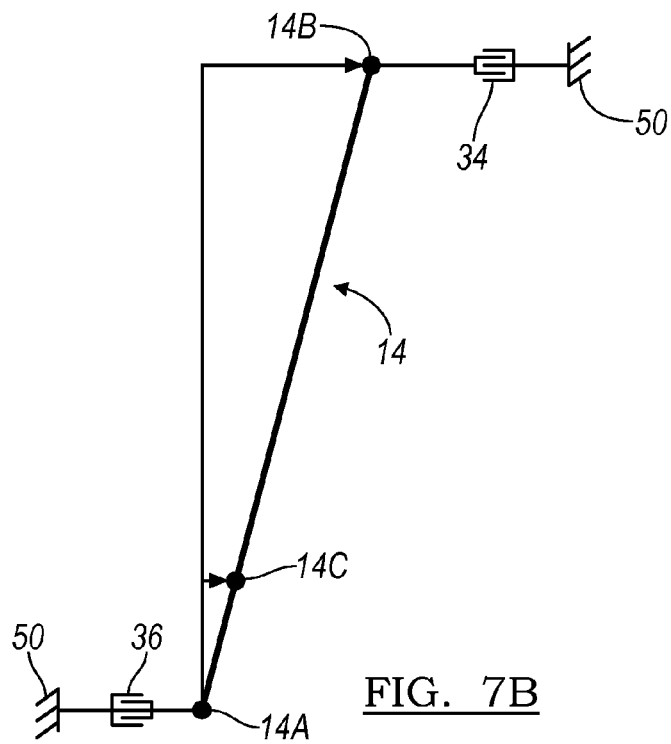
FIG. 7B is a lever diagram of the transmission of FIGS. 1A and 7A, showing a partial application of an embodiment of a method in accordance with the principles of the present invention.

For example, referring to FIGS. 7A-7B, the lever diagram is illustrated for the transmission 10, in which the input member 12 is driven directly via a motor or engine, without a torque converter disposed between the engine and the transmission 10. FIG. 7A shows the motion of the transmission nodes, input, and output when the vehicle is in neutral. As such, the output member 22 is motionless, and the input member 12 must continue to rotate to avoid stalling the motor or engine. The nodes 18A, 18B, 16A, 16B, 20A, 14C, and 14A rotate in a positive direction, and the nodes 20C and 14B rotate in a negative direction.

As such, similar to the variations shown and described above, the second member 14B of the first planetary gear set 14 is spinning in the negative direction, which may be undesirable for applying the high gain clutch 34. To smoothly engage the high gain clutch 34 (so that the transmission 10 can proceed into first gear), it may be desirable to stop the second member 14B from spinning. The method 100 may be used to apply the first brake 36 prior to applying the second brake (high gain clutch) 34. However, referring to FIG. 7B, in this embodiment, the input member 12 cannot stop rotating (without stalling), and the third node 14C of the first planetary gear set 14 is continuously connected for common rotation with the input member 12, so the third member 14C will also not stop spinning. Thus, the second member 14B must also continue to spin and cannot be stopped. Accordingly, when the first brake 36 is applied to the first member 14A, both the second and third members 14B, 14C continue spinning, but the second member 14B of the first planetary gear set 14 changes from negative to positive spinning, passing by zero speed.

Figure 7C:
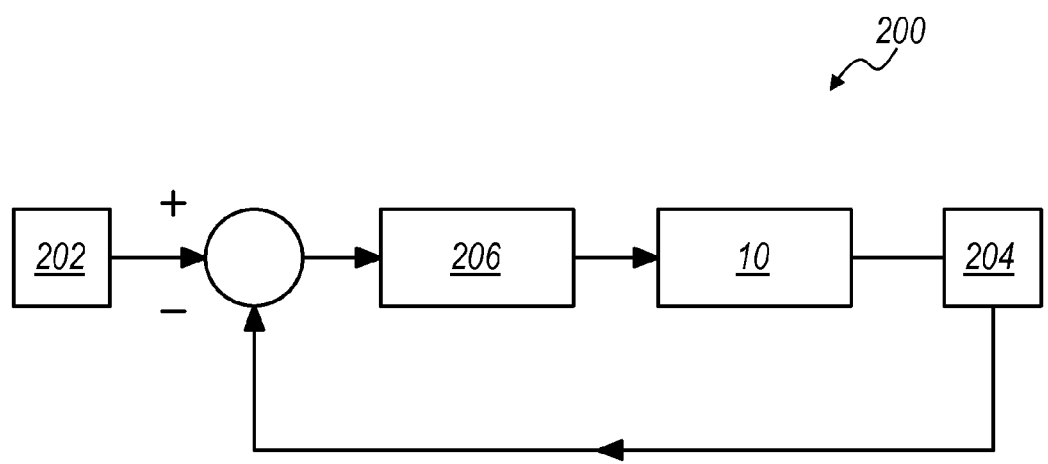
FIG. 7C is a schematic diagram of a control system for use with the method of FIG. 4, according to the principles of the present invention.

Accordingly, in this embodiment, the method 100 includes applying the second brake (high gain clutch) 34 when the second member 14B reaches zero or near zero speed before it spins in a positive direction as shown in FIG. 7B. Therefore, referring now to FIG. 7C, an algorithm and closed loop control system 200 can be used to determine when the second member 14B is at zero or close to zero speed. A predetermined upper threshold 202 for the desired second node 14B speed is input to the control system 200. In some variations, the predetermined upper threshold speed 202 is near zero.

In order to get the second member 14B to a speed that is at or below the predetermined upper threshold 202, pressure is applied to the first brake 36 without fully engaging the first brake 36. As illustrated in FIGS. 7A-7B, when the first brake 36 is not applied, the second node 14B spins in a negative direction (FIG. 7A), and when the first brake 36 is fully engaged (FIG. 7B), the second node 14B spins in a positive direction; therefore, when the first brake 36 is partially engaged, by applying an amount of pressure that is lower than its full engagement pressure (in between the pressure applied in FIG. 7A (zero) and in FIG. 7B (full)). To result in the desired amount of pressure being applied to the first brake 36, the control system 200 may be used (see FIG. 7C).

Thus, the method 100 includes additional steps of determining the actual speed of the second member 14B at box 204 in the control system. The actual speed may be determined in any suitable manner, such as by measuring or estimating. The method 100 includes comparing the absolute value of the actual speed of the second member 14B with the predetermined upper threshold speed 202. The method 100 could include, for example, providing the actual speed of the second member 14B and the predetermined upper threshold 204 to a PID controller 206.

If the absolute value (or magnitude) of the actual speed of the second member 14B exceeds the predetermined upper threshold 202, the PID controller 206 estimates an amount of pressure or an amount of change in pressure to apply to the first brake 36 by the transmission 10. Accordingly, the PID controller 206 sends a signal to the transmission 10 to command the transmission 10 to apply an estimated desired fluid pressure to the first brake 36, which is based on the actual speed of the second member 14B and the predetermined upper threshold 202.

Figure 7D:
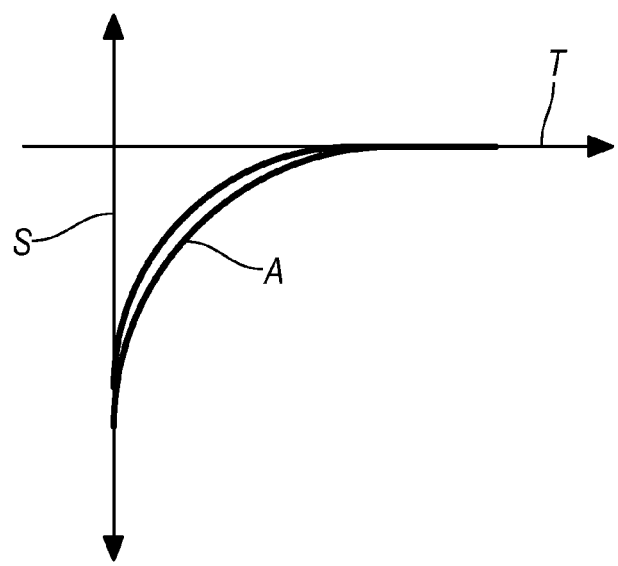
FIG. 7D is a graph illustrating results of implementing an embodiment of a method according to the principles of the present invention.

In some variations, the PID controller 206 is not used to determine the estimated pressure, but a strong command profile using a PID controller 206 can help move the actual speed closer and closer to zero without overshooting into the positive spin range, which helps stabilize the result. For example, as shown in FIG. 7D, the speed S is illustrated on a vertical axis, with time T illustrated on a horizontal axis. The actual speed profile A is below the time T axis because the second member 14B spins in a negative direction (unless it overshoots the zero target, which is not shown in FIG. 7C). The PID controller 206 may cause the actual speed A of the second member 14B to approach zero (or the predetermined upper threshold 202, which is preferably close to zero) without overshooting into a positive speed range.

The steps of determining the actual speed A of the second member 14B, comparing the absolute value of the actual speed A to a predetermined upper threshold 202, and adjusting the fluid pressure applied to the first brake 36 are repeated until the absolute value of the actual speed A drops below or equals the predetermined upper threshold 202.

Referring back to FIG. 6, the shift table for various scenarios of the transmission 10, which is not connected to a torque converter, are illustrated. For example, when shifting from reverse to drive, the first clutch 26, the first brake 36, the fourth brake 32, and the second brake 34 are applied. Prior to applying the second brake 34, the first brake 36 is engaged, as explained above, and a controller, such as PID controller 206, determines how much fluid pressure to apply to the first brake 36 to result in a zero or near zero slip speed across the second member 14B. Once the desired slip speed exists, the second brake 34 is applied. Then, the first brake 36 is released. The fourth brake 32 and the first clutch 26 are also released, and they may be released before or after the second brake 34 is applied.

As illustrated in FIG. 6, when a vehicle is rolling in reverse, and the vehicle is shifted into drive, an additional brake (the third brake 30) is applied. This occurs in order to brake the output member 22, similar to the scenario described above with respect to FIGS. 5A and 5B, except that FIG. 6 applies to the transmission 10 for use without a torque converter as illustrated in FIGS. 7A-7D. Therefore, both the first and third brakes 36, 30 are applied prior to applying the second brake 34, and then the first and third brakes 36, 30 are released. In the alternative, the output member 22 could be braked with the vehicle braking system, as explained above. For a drive to first gear launch, the second brake 34 is applied in a steady state manner, and the fourth brake 32 is applied. For a drive to first gear steady state shift, the second and fourth brakes 34, 32 are applied in a steady state manner.

Figure 8A:
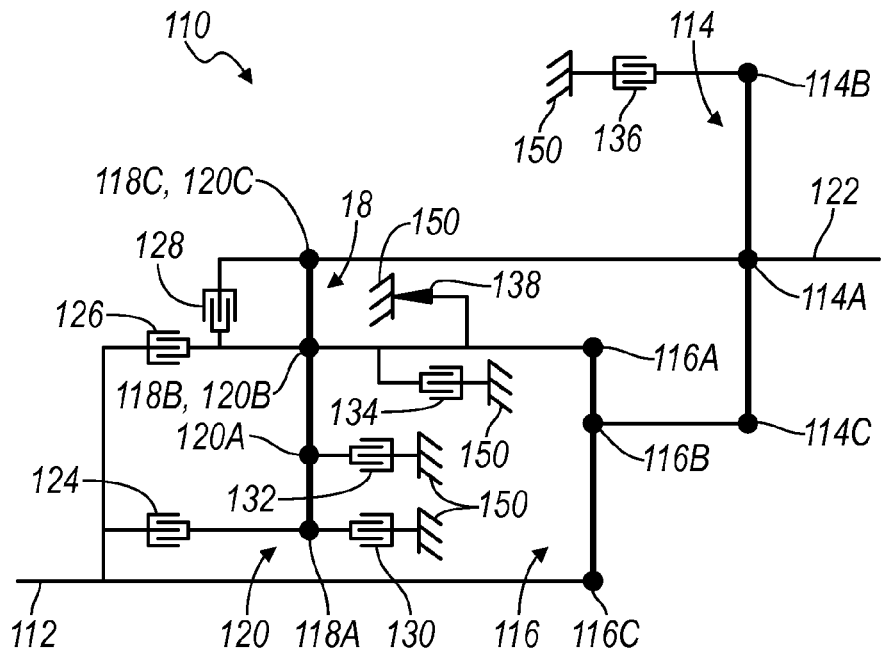
FIG. 8A is a lever diagram of a nine speed transmission utilized for an embodiment of the method according to the present invention.
Figure 8B:
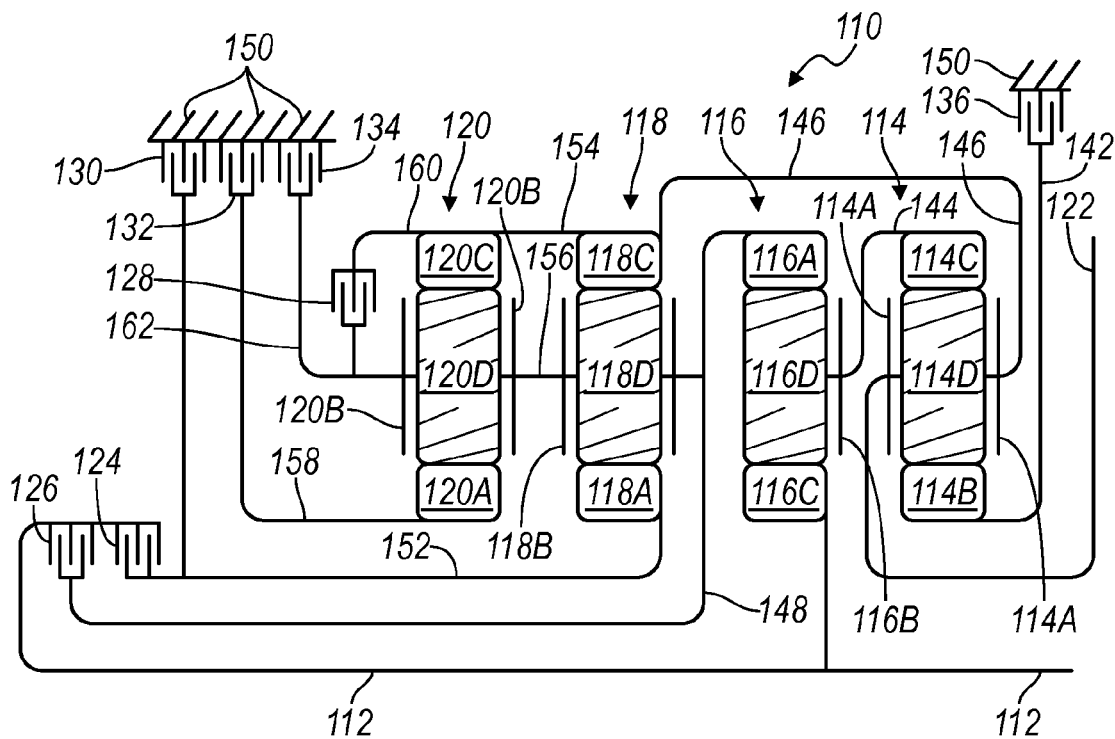
FIG. 8B is a diagrammatic illustration of a nine speed transmission utilized for an embodiment of the method according to the present invention.

Referring now to FIGS. 8A-8C, another embodiment of a transmission 110 in accordance with present disclosure is illustrated in a lever diagram format. The transmission 110 may be a nine speed transmission. The transmission 110 includes an input shaft or member 112, a first planetary gear set 114, a second planetary gear set 116, a third planetary gear set 118, a fourth planetary gear set 120, and an output shaft or member 122.

The first planetary gear set 114 has three nodes: a first node 114A, a second node 114B, and a third node 114C. The second planetary gear set 116 has three nodes: a first node 116A, a second node 116B, and a third node 116C. In the lever diagram of FIG. 8A, the levers for the third planetary gear set 118 and the fourth planetary gear set 120 have been combined into a single four node lever having: a first node 118A, a second node 120A, a third node 118B, 120B, and a fourth node 118C, 120C. Thus, the second member 118B of the third planetary gear set 118 is coupled directly to the second member 120B of the fourth planetary gear set 120 and the third member 118C of the third planetary gear set 118 is coupled directly to the third member 120C of the fourth planetary gear set 120.

The input member 112 is continuously coupled to the third node 116C of the second planetary gear set 116. The output member 122 is coupled to the first node 114A of the first planetary gear set 114 and the fourth node 118C, 120C of the combined levers of the third and fourth planetary gear sets 118, 120 (which could alternatively be illustrated as two third nodes 118C, 120C of two different levers). The third node 114C of the first planetary gear set 114 is coupled to the second node 116B of the second planetary gear set 116. The first node 116A of the second planetary gear set 116 is coupled to the third node 118B, 120B of the combined levers of the third and fourth planetary gear sets 118, 120 (which could alternatively be illustrated as two different second nodes 118B, 120B of two different levers).

A first clutch 126 selectively connects the third node 116C of the second planetary gear set 116 and the input member or shaft 112 with the third node 118B, 120B of the combined levers of the third and fourth planetary gear sets 118, 120 and the first node 116A of the second planetary gear set 116. A second clutch 124 selectively connects the third node 116C of the second planetary gear set 116 and the input member or shaft 112 with the first node 118A of the combined levers of the third and fourth planetary gear sets 118, 120. A third clutch 128 selectively connects the first node 116A of the second planetary gear set 116 and the third node 118B, 120B of the combined levers of the third and fourth planetary gear sets 118, 120 with the fourth node 118C, 120C of the combined levers of the third and fourth planetary gear sets 118, 120 and the first node 114A of the first planetary gear set 114.

A first brake 136 selectively connects the second node 114B of the first planetary gear set 114 with the stationary member or transmission housing 150. A fourth brake 130 selectively connects the first node 118A of the combined levers of the third and fourth planetary gear sets 118, 120 with a stationary member or transmission housing 150. A second brake 132 selectively connects the second node 120A of the combined levers of the third and fourth planetary gear sets 118, 120 with a stationary member or transmission housing 150. A third brake 134 selectively connects the third node 118B, 120B of the combined levers of the third and fourth planetary gear sets 118, 120 and the first node 116A of the second planetary gear set 116 with the stationary member or transmission housing 150.

In an alternate embodiment, the present disclosure contemplates the inclusion of a one-way clutch 138. One-way clutch 138 selectively connects the third node 118B, 120B of the combined levers of the third and fourth planetary gear sets 118, 120 and the first node 116A of the second planetary gear set 116 with the stationary member or transmission housing 150.

Referring now to FIG. 8B, a stick diagram presents a schematic layout of an embodiment of the nine speed transmission 110 according to an aspect of the present invention. In FIG. 8B, the numbering from the lever diagram of FIG. 8A is carried over. The clutches and couplings are correspondingly presented and the nodes of the planetary gear sets now appear as components of planetary gear sets such as sun gears, ring gears, planet gears and planet gear carriers. In an embodiment of the present invention, the four planetary gear sets 114, 116, 118 and 120 are simple planetary gear sets, as described below. However, the present invention contemplates other embodiments that replace the simple planetary gear sets with all or a combination of compound planetary gear sets having two or more sets of planet pinions supported by a single carrier member.

The planetary gear set 114 includes a sun gear member 114B, a ring gear member 114C and a planet gear carrier member 114A that rotatably supports a set of planet gears 114D (only one of which is shown). The sun gear member 114B is connected for common rotation with a first shaft or interconnecting member 142. The ring gear member 114C is connected for common rotation with a second shaft or interconnecting member 144. The planet carrier member 114A is connected for common rotation with a third shaft or interconnecting member 146 and the output shaft or member 122. The planet gears 114D are each configured to intermesh with both the sun gear member 114B and the ring gear member 114C.

The planetary gear set 116 includes a sun gear member 116C, a ring gear member 116A, and a planet gear carrier member 116B that rotatably supports a set of planet gears 116D (only one of which is shown). The sun gear member 116C is connected for common rotation with the input shaft or member 112. The ring gear member 116A is connected for common rotation with a fourth shaft or interconnecting member 148. The planet carrier member 116B is connected for common rotation with the second shaft or interconnecting member 144. The planet gears 116D are each configured to intermesh with both the sun gear member 116C and the ring gear member 116A.

The planetary gear set 118 includes a sun gear member 118A, a ring gear member 118C, and a planet gear carrier member 118B that rotatably supports a set of planet gears 118D (only one of which is shown). The sun gear member 118A is connected for common rotation with a fifth shaft or interconnecting member 152. The ring gear member 118C is connected for common rotation with the third shaft or interconnecting member 146 and with a sixth shaft or interconnecting member 154. The planet carrier member 118B is connected for common rotation with the fourth shaft or interconnecting member 148 and with a seventh shaft or interconnecting member 156. The planet gears 118D are each configured to intermesh with both the sun gear member 118A and the ring gear member 118C.

The planetary gear set 120 includes a sun gear member 120A, a ring gear member 120C and a planet gear carrier member 120B that rotatably supports a set of planet gears 120D (only one of which is shown). The sun gear member 120A is connected for common rotation with an eighth shaft or interconnecting member 158. The ring gear member 120C is connected for common rotation with the sixth shaft or interconnecting member 154 and with a ninth shaft or interconnecting member 160. The planet carrier member 120B is connected for common rotation with the seventh shaft or interconnecting member 156 and with a tenth shaft or interconnecting member 162. The planet gears 120D are each configured to intermesh with both the sun gear member 120A and the ring gear member 120C.

The input shaft or member 112 is continuously connected to an engine (not shown) through a turbine of a torque converter, fluid coupling, friction launch clutch or other starting device (not shown), or it may be connected directly to the engine output shaft or an electric motor. The output shaft or member 122 is continuously connected with the final drive unit or transfer case (not shown).

The torque-transmitting mechanisms or clutches 124, 126, 128 and brakes 130, 132, 134, 136 allow for selective interconnection of the shafts or interconnecting members, members of the planetary gear sets, and the transmission housing. The clutches 124, 126, 128 and brakes 130, 132, 134, 136 may be friction, dog or synchronizer type mechanisms or the like. In the illustrated embodiment, the first brake 136 is a high gain clutch, such as a dog clutch or a band clutch, of the type that was described above with respect to FIGS. 1A-1B, and the rest of the clutches 124, 126, 128 and brakes 130, 132, 134 are friction clutches, as hereinbefore described.

The first clutch 126 is selectively engageable to connect the input shaft or member 112 with the fourth shaft or interconnecting member 148. The second clutch 124 is selectively engageable to connect the input shaft or member 112 with the fifth shaft or interconnecting member 152. The third clutch 128 is selectively engageable to connect the ninth shaft or interconnecting member 160 with the tenth shaft or interconnecting member 162.

The first brake 136 is selectively engageable to connect the first shaft or interconnecting member 142 with the stationary element or the transmission housing 150 in order to restrict the member 142 from rotating relative to the transmission housing 150. The second brake 132 is selectively engageable to connect the eighth shaft or interconnecting member 158 with the stationary element or the transmission housing 150 in order to restrict the member 158 from rotating relative to the transmission housing 150. The third brake 134 is selectively engageable to connect the tenth shaft or interconnecting member 162 with the stationary element or the transmission housing 150 in order to restrict the member 162 from rotating relative to the transmission housing 150. The fourth brake 130 is selectively engageable to connect the fifth shaft or interconnecting member 152 with the stationary element or the transmission housing 150 in order to restrict the member 152 from rotating relative to the transmission housing 150.

Alternatively, in another embodiment of the present invention one-way clutch or freewheeler 138 selectively connects the carrier members 118B and 120B of the third and fourth planetary gear sets 118, 120 and the ring gear 116A of the second planetary gear set 116 with the transmission housing 150. Accordingly, a first to a second gear ratio shift is achieved through the use of freewheeler 138. In the instant embodiment, then the third brake 134 is not applied in reverse and first gear, as shown in the table of FIG. 8C.

Referring now to FIGS. 8B and 8C, the operation of the nine speed transmission 110 will be described. It will be appreciated that transmission 110 is capable of transmitting torque from the input shaft or member 112 to the output shaft or member 122 in at least nine forward speed or torque ratios and at least one reverse speed or torque ratio. Each forward and reverse speed or torque ratio is attained by engagement of two or more of the torque-transmitting mechanisms (i.e. first clutch 126, second clutch 124, third clutch 128, first brake 136, second brake 132, third brake 134 and fourth brake 130), as will be explained below.

FIG. 8C is a truth table that present the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 110. Of course, other gear ratios are achievable depending on the gear diameter, gear teeth count and gear configuration selected.

With specific reference to FIG. 8C, a truth table is presented illustrating a state of engagement of the various torque transmitting elements in each of the available forward and reverse speeds or gear ratios of the transmission 110. Accordingly, a reverse gear is established through the engagement or activation of the second clutch 124 and the third brake 134.

The second clutch 124 connects the input shaft or member 112 with the fifth shaft or interconnecting member 152. The third brake 134 connects the tenth shaft or interconnecting member 162 with the stationary element or the transmission housing 150 in order to restrict the member 162 from rotating relative to the transmission housing 150. Likewise, the nine forward ratios are achieved through different combinations of clutch and brake engagement, as shown in FIG. 8C.

Though ten interconnecting members 142, 144, 146, 148, 152, 154, 156, 158, 160, 162 are shown and described in FIG. 8B, it should be understood that any of the interconnecting members that rotate together may be formed as one piece or otherwise connected together with the elements to which they are connected. For example, the interconnecting members 148, 156, and 162 may alternatively be described or formed as a single interconnecting member because they rotate together with each other and the members 120B, 118B, 116A to which they are connected.

Referring now to FIG. 9A, a shift diagram is illustrates and implementation of the method 100 for shifting a transmission connected to a torque converter, for use with the transmission 110 of FIGS. 8A-8C. Thus, the method 100 illustrated in FIG. 4 is applied to the transmission 110 illustrated in FIGS. 8A-8C. As described above, the method 100 includes a step 102 of applying a torque transmitting mechanism to interconnect a first member with another member of a planetary gear set. In the variation of the transmission 110 of FIGS. 8A-8B, the first member may be any of the members connected to the first clutch 126. As such, the first member may be the ring gear member 116A of the second planetary gear set 116, or a planetary gear carrier member 118B, 120B of the third or fourth planetary gear set 118, 120, which are commonly connected on one side of the first clutch 126, or the sun gear member 116C, which is connected to the input member 112 on the other side of the first clutch 126.

The method 100 further includes a step 104 of applying a high gain clutch (dog clutch or band clutch) to interconnect a second member with another member, while the torque transmitting mechanism is applied. Therefore, in this embodiment, while the first clutch 126 is applied, the first brake 136 (which is the high gain clutch) is applied to the second member 114B of the first planetary gear set 114, thereby connecting the second member 114B to the stationary member 150. As seen in FIG. 9A, the first clutch 126 and the first brake 136 are active to shift from neutral to drive. The third brake 134 is also applied in a steady state manner during neutral, reverse, and drive, and shifts therebetween, in this embodiment. Accordingly, similar to the more in-depth discussion above with respect to the transmission 10 of FIGS. 1A-1B, engaging the first clutch 126 prior to engaging the first brake 136 (while third brake 134 is applied steady state) slows down or stops the second member 114 of the first planetary gear set 114 before the first brake 136 is applied, thereby creating a smooth shifting transition. After the first brake 136 is applied, the first clutch 126 is released.

The rest of the shift diagram illustrates the various other shifting elements that are applied actively or in a steady state manner to implement the method 100 with respect to the planetary gear set 110 that has a torque converter connected to its input member 112. Other than the exact torque transmitting members that are applied, the description above with respect to the shift diagram of FIG. 6 applies to the shift diagram of FIG. 9A as well. For example, to shift from reverse to drive, the method 100 in this embodiment includes applying the first and second clutches 126, 124 prior to applying the first brake 136 (while the third brake 134 is applied in a steady state). While the first and second clutches 126, 124 are applied, the first brake 136 is then applied. After the first brake 136 is applied, the method 100 includes releasing the first and second clutches 126, 124.

In a rolling garage shift from reverse to drive, the method 100 in this embodiment includes applying the third brake 134 in a steady state manner. The method 100 also includes applying the first and second clutches 126, 124 prior to applying the first brake 136. In addition, the method 100 includes applying either the third clutch 128 or the second brake 132 prior to applying the first brake 136. While the first and second clutches 126, 124 and either the third clutch 128 or the second brake 132 are applied, the first brake 136 is then applied. After the first brake 136 is applied, the method 100 includes releasing the first and second clutches 126, 124 and the third clutch 128 or second brake 132.

Finally, FIG. 9A illustrates that, in a drive to first gear launch, the third brake 134 and the first brake 136 are applied in a steady state manner; and in a drive to a steady state first gear, the third brake 134 and the first brake 136 are applied in a steady state manner.

Now referring to FIG. 9B, another shift diagram illustrates the implementation of the method 100 for a transmission 110 having no torque converter, and wherein the input member 112 is connected directly to the engine output shaft and/or an electric motor shaft. Thus, for example, to shift from neutral to drive, the first clutch 126 and the third brake 134 are applied, and then the high gain clutch 136 is applied. More particularly, first, the first clutch 126 and the third brake 134 are applied, and while these are applied, the first brake 136 is applied. After the first brake 136 is applied, the first clutch 126 and the third brake 134 are released. The rest of the scenarios for garage shifting are illustrated in FIG. 9B for a transmission 110 with no torque converter.

Other than the exact torque transmitting members that are applied, the description above with respect to the shift diagram of FIG. 6 applies to the shift diagram of FIG. 9B as well. For example, to shift from reverse to drive, the method 100 in this embodiment includes applying the first and second clutches 126, 124 and the third brake 134 prior to applying the first brake 136. While the first and second clutches 126, 124 and the third brake 134 are applied, the first brake 136 is then applied. After the first brake 136 is applied, the method 100 includes releasing the first and second clutches 126, 124 and the third brake 134.

In a rolling garage shift from reverse to drive, the method 100 in this embodiment includes applying the first and second clutches 126, 124 and the third brake 134 prior to applying the first brake 136. In addition, the method 100 includes applying either the third clutch 128 or the second brake 132 prior to applying the first brake 136. While the first and second clutches 126, 124, the third brake 134, and either the third clutch 128 or the second brake 132 are applied, the first brake 136 is then applied. After the first brake 136 is applied, the method 100 includes releasing the first and second clutches 126, 124, the third brake 134, and the third clutch 128 or second brake 132.

Finally, FIG. 9B illustrates that, in a drive to first gear launch, the first brake 136 is applied in a steady state manner and the third brake 134 is active; and in a drive to a steady state first gear, the third brake 134 and the first brake 136 are applied in a steady state manner.

It should be understood that the method 100 as described herein, including its various optional steps hereinbefore described, applies equally with respect to the embodiment of FIGS. 8A-8C and 9A-9B, without being described in the paragraphs that describe these figures. Thus, the method 100 for the transmission 110 of FIGS. 8A-8C may include using the control system 200 illustrated in FIG. 7C to determine a desired pressure to apply to the first clutch 126. In addition, by way of example, the method 100 may include braking the output member 122 by using the vehicle braking system, or braking the output member 122 with one or more of the torque transmitting mechanisms, as described above.

As above, each of the active clutches and/or steady state applied clutches in the FIGS. 9A-9B may have pressure applied to them such that they are partially engaged, or they may be fully engaged or locked, as desired.

Referring now to FIGS. 10A-10C, another embodiment of a transmission 210 in accordance with present disclosure is illustrated in a lever diagram format. The transmission 210 is a ten speed transmission 210 and is illustrated in a lever diagram format in FIG. 10A. The transmission 210 includes an input shaft or member 212, a first planetary gear set 214, a second planetary gear set 216, a third planetary gear set 218, a fourth planetary gear set 220, and an output shaft or member 222. In the lever diagram of FIG. 10A, the first planetary gear set 214 has three nodes: a first node 214A, a second node 214B, and a third node 214C. The second planetary gear set 216 has three nodes: a first node 216A, a second node 216B, and a third node 126C. The third planetary gear set 218 has three nodes: a first node 218A, a second node 218B, and a third node 218C. The fourth planetary gear set 220 has three nodes: a first node 220A, a second node 220B, and a third node 220C.

The input member 212 is continuously coupled to the third node 216C of the second planetary gear set 216. The output member 222 is coupled to the first node 214A of the first planetary gear set 214 and the third node 218C of the third planetary gear set 218. The first node 214A of the first planetary gear set 214 is coupled to the third node 218C of the third planetary gear set 218. The third node 214C of the first planetary gear set 214 is coupled to the second node 216B of the second planetary gear set 216. The first node 216A of the second planetary gear set 216 is coupled to the second node 218B of the third planetary gear set 218. The first node 218A of the third planetary gear set 218 is coupled to the first node 220A of the fourth planetary gear set 220. The second node 218B of the third planetary gear set 218 is coupled to the second node 220B of the fourth planetary gear set 220.

A first clutch 228 selectively connects the input member or shaft 212 and the third node 216C of the second planetary gear set 216 with the first node 216A of the second planetary gear set 216, the second node 218B of the third planetary gear set 218, and the second node 220B of the fourth planetary gear set 220. A second clutch 226 selectively connects the input member or shaft 212 and the third node 216C of the second planetary gear set 216 with the first node 218A of the third planetary gear set 218 and the first node 220A of the fourth planetary gear set 220. A third clutch 230 selectively connects the first node 216A of the second planetary gear set 216, the second node 218B of the third planetary gear set 218, and the second node 220B of the fourth planetary gear set 220 with the third node 218C of the third planetary gear set 218, the first node 214A of the first planetary gear set 214, and the output member 222.

A first brake 238 selectively connects the second node 214B of the first planetary gear set 214 with the stationary member or transmission housing 250. A second brake 234 selectively connects the first node 218A of the third planetary gear set 218 and the first node 220A of the fourth planetary gear set 220 with the stationary member or transmission housing 250. A third brake 236 selectively connects the first node 216A of the second planetary gear set 216, the second node 218B of the third planetary gear set 218, and the second node 220B of the fourth planetary gear set 220 with the stationary member or transmission housing 250. A fourth brake 232 selectively connects the third node 220C of the fourth planetary gear set 220 with a stationary member or transmission housing 250.

The first brake 238 is a high gain clutch, such as a dog clutch or band clutch, which are described above. The rest of the clutches 226, 228, 230 and brakes 232, 234, 236 may be friction clutches, if desired, or any other type of suitable clutch.

Referring now to FIG. 10B, a stick diagram presents a schematic layout of an embodiment of the ten speed transmission 210 for use with the method of the present disclosure. In FIG. 10B, the numbering from the lever diagram of FIG. 10A is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 214, 216, 218 and 220 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 214 includes a sun gear member 214B, a ring gear member 214C, and a planet gear carrier member 214A that rotatably supports a set of planet gears 214D (only one of which is shown). The sun gear member 214B is connected for common rotation with a first shaft or interconnecting member 242. The ring gear member 214C is connected for common rotation with a second shaft or interconnecting member 244. The planet carrier member 214A is connected for common rotation with the output shaft or member 222. The planet gears 214D are each configured to intermesh with both the sun gear member 214B and the ring gear member 214C.

The planetary gear set 216 includes a sun gear member 216C, a ring gear member 216A, and a planet gear carrier member 216B that rotatably supports a set of planet gears 216D (only one of which is shown). The sun gear member 216C is connected for common rotation with the input shaft or member 212. The ring gear member 216A is connected for common rotation with a third shaft or interconnecting member 246. The planet carrier member 216B is connected for common rotation with the second shaft or interconnecting member 244. The planet gears 216D are each configured to intermesh with both the sun gear member 216C and the ring gear member 216A.

The planetary gear set 218 includes a sun gear member 218A, a ring gear member 218C and a planet gear carrier member 218B that rotatably supports a set of planet gears 218D (only one of which is shown). The sun gear member 218A is connected for common rotation with a fourth shaft or interconnecting member 248 and a fifth shaft or interconnecting member 252. The ring gear member 218C is connected for common rotation with the output shaft or member 222. The planet carrier member 218B is connected for common rotation with the third shaft or interconnecting member 246 and with a sixth shaft or interconnecting member 254. The planet gears 218D are each configured to intermesh with both the sun gear member 218A and the ring gear member 218C.

The planetary gear set 220 includes a sun gear member 220C, a ring gear member 220B and a planet gear carrier member 220A that rotatably supports a set of planet gears 220D (only one of which is shown). The sun gear member 220C is connected for common rotation with a seventh shaft or interconnecting member 256. The ring gear member 220B is connected for common rotation with an eighth shaft or interconnecting member 258 and with the sixth shaft or interconnecting member 254. The planet carrier member 220A is connected for common rotation with the fifth shaft or interconnecting member 252 and with a ninth shaft or interconnecting member 260. The planet gears 220D are each configured to intermesh with both the sun gear member 220C and the ring gear member 220B.

The input shaft or member 212 is continuously connected to an engine (not shown), to a turbine of a torque converter (not shown), or to an electric motor (not shown). The output shaft or member 222 is continuously connected with the final drive unit or transfer case (not shown).

The torque-transmitting mechanisms or clutches 226, 228, 230 and brakes 232, 234, 236, 238 allow for selective interconnection of the shafts or interconnecting members, members of the planetary gear sets and the transmission housing. For example, the first clutch 228 is selectively engageable to connect the input shaft or member 212 with the third shaft or interconnecting member 246. The second clutch 226 is selectively engageable to connect the input shaft or member 212 with the fourth shaft or interconnecting member 248. The third clutch 230 is selectively engageable to connect the output shaft or member 222 with the sixth shaft or interconnecting member 254.

The first brake 238 is selectively engageable to connect the first shaft or interconnecting member 242 with the stationary element or the transmission housing 250 in order to restrict the member 242 from rotating relative to the transmission housing 250. The fourth brake 232 is selectively engageable to connect the seventh shaft or interconnecting member 256 with the stationary element or the transmission housing 250 in order to restrict the member 256 from rotating relative to the transmission housing 250. The second brake 234 is selectively engageable to connect the ninth shaft or interconnecting member 260 with the stationary element or the transmission housing 250 in order to restrict the member 260 from rotating relative to the transmission housing 250. The third brake 236 is selectively engageable to connect the eighth shaft or interconnecting member 258 with the stationary element or the transmission housing 250 in order to restrict the member 258 from rotating relative to the transmission housing 250.

Referring now to FIGS. 10B and 10C, the operation of the ten speed transmission 210 will be described. It will be appreciated that transmission 210 is capable of transmitting torque from the input shaft or member 212 to the output shaft or member 222 in at least ten forward speed or torque ratios and at least one reverse speed or torque ratio. Each forward and reverse speed or torque ratio is attained by engagement of one or more of the torque-transmitting mechanisms (i.e. first clutch 228, second clutch 226, third clutch 230, first brake 238, second brake 234, third brake 236, and fourth brake 232), as will be explained below.

FIG. 10C is a truth table presenting the various combinations of torque-transmitting mechanisms that are activated or engaged to achieve the various gear states. Actual numerical gear ratios of the various gear states are also presented although it should be appreciated that these numerical values are exemplary only and that they may be adjusted over significant ranges to accommodate various applications and operational criteria of the transmission 210. Of course, other gear ratios are achievable depending on the gear diameter, gear teeth count and gear configuration selected.

For example to establish a reverse gear, the second clutch 226 and the third brake 236 are engaged or activated. The second clutch 226 connects the input shaft or member 212 with the fourth shaft or interconnecting member 248. The third brake 236 connects the eighth shaft or interconnecting member 258 with the stationary element or the transmission housing 250 in order to restrict the member 258 from rotating relative to the transmission housing 250. Likewise, the ten forward ratios are achieved through different combinations of clutch and brake engagement, as shown in FIG. 10C.

It will be appreciated that the foregoing explanation of operation and gear states of the ten speed transmission 210, as illustrated in FIG. 10C, assumes, first of all, that all the clutches not specifically referenced in a given gear state are inactive or disengaged and, second of all, that during gear shifts, i.e., changes of gear state, between at least adjacent gear states, a clutch engaged or activated in both gear states will remain engaged or activated.

Referring now to FIG. 11A, a shift diagram illustrates an implementation of the method 100 for shifting a transmission connected to a torque converter, for the transmission 210 of FIGS. 10A-10C. Thus, the method 100 illustrated in FIG. 4 is applied to the transmission 210 illustrated in FIGS. 10A-10C. As described above, the method 100 includes a step 102 of applying a torque transmitting mechanism to interconnect a first member with another member of a planetary gear set. In the variation of the transmission 210 of FIGS. 10A-10B, the first member may be any of the members connected to the first clutch 228. As such, the first member may be the ring gear member 216A, 220B of the second or fourth planetary gear set 216, 220, or the planetary gear carrier member 218B of the third planetary gear set 118, which are commonly connected on one side of the first clutch 228, or the sun gear member 216C, which is connected to the input member 212 on the other side of the first clutch 228.

The method 100 further includes a step 104 of applying a high gain clutch (dog clutch or band clutch) to interconnect a second member with another member, while the torque transmitting mechanism is applied. Therefore, in this embodiment, while the first clutch 228 is applied, the first brake 238 (which is the high gain clutch) is applied to the second member 214B of the first planetary gear set 214, thereby connecting the second member 214B to the stationary member 250. As seen in FIG. 11A, the first clutch 228 and the first brake 238 are active to shift from neutral to drive. The third brake 236 is also applied in a steady state manner during reverse, neutral, and drive. After the first brake 238 is applied, the first clutch 228 is released.

The rest of the shift diagram illustrates the various other shifting elements that are applied actively or in a steady state manner to implement the method 100 with respect to the transmission 210 that has a torque converter connected to its input member 212. Other than the exact torque transmitting members that are applied, the description above with respect to the shift diagram of FIG. 6 applies to the shift diagram of FIG. 11A as well.

For example, to shift from reverse to drive, the method 100 in this embodiment includes applying the first and second clutches 228, 226 prior to applying the first brake 238. As stated above, the third brake 236 is also applied in a steady state manner during reverse, neutral, and drive. While the first and second clutches 228, 226 and the third brake 236 are applied, the first brake 238 is then applied. After the first brake 238 is applied, the method 100 includes releasing the first and second clutches 228, 226 (but the third brake 236 remains applied in a steady state manner).

In a rolling garage shift from reverse to drive, the method 100 in this embodiment includes applying the first and second clutches 228, 226 prior to applying the first brake 238. Again, the third brake 236 remains applied in a steady state manner in reverse, neutral, and drive, at least for first gear as illustrated in the diagram. In addition, the method 100 includes applying either the third clutch 230 or the second brake 234 prior to applying the first brake 238. While the first and second clutches 228, 226, the third brake 236, and either the third clutch 230 or the second brake 234 are applied, the first brake 238 is then applied. After the first brake 238 is applied, the method 100 includes releasing the first and second clutches 228, 226, the third brake 236, and the third clutch 230 or second brake 234.

Finally, FIG. 11A illustrates that, in a drive to first gear launch, the first brake 238 and the third brake 236 are applied in a steady state manner; and in a drive to a steady state first gear, the first brake 238 and the third brake 236 are applied in a steady state manner.

Now referring to FIG. 11B, another shift diagram illustrates the implementation of the method 100 for a transmission 210 having no torque converter, and wherein the input member 212 is connected directly to the engine output shaft and/or an electric motor shaft. Thus, for example, to shift from neutral to drive, the first clutch 228 and the third brake 236 are applied, and then the high gain clutch 238 is applied. More particularly, first, the first clutch 228 and the third brake 236 are applied, and while these are applied, the first brake 238 is applied. After the first brake 238 is applied, the first clutch 228 and the third brake 236 are released. The rest of the scenarios for garage shifting are illustrated in FIG. 11B for a transmission 210 with no torque converter.

Other than the exact torque transmitting members that are applied, the description above with respect to the shift diagram of FIG. 6 applies to the shift diagram of FIG. 11B as well. For example, to shift from reverse to drive, the method 100 in this embodiment includes applying the first and second clutches 228, 226 and the third brake 236 prior to applying the first brake 238. While the first and second clutches 228, 226 and the third brake 236 are applied, the first brake 238 is then applied. After the first brake 238 is applied, the method 100 includes releasing the first and second clutches 228, 226 and the third brake 236.

In a rolling garage shift from reverse to drive, the method 100 in this embodiment includes applying the first and second clutches 228, 226 and the third brake 236 prior to applying the first brake 136. In addition, the method 100 includes applying either the third clutch 230 or the second brake 234 prior to applying the first brake 238. While the first and second clutches 228, 226, the third brake 236, and either the third clutch 230 or the second brake 234 are applied, the first brake 238 is then applied. After the first brake 238 is applied, the method 100 includes releasing the first and second clutches 228, 226, the third brake 236, and the third clutch 230 or second brake 234.

Finally, FIG. 11B illustrates that, in a drive to first gear launch, the first brake 238 is applied in a steady state manner and the third brake 236 is active; and in a drive to a steady state first gear, the third brake 236 and the first brake 238 are applied in a steady state manner.

It should be understood that the method 100 as described herein, including its various optional steps hereinbefore described, applies equally with respect to the embodiment of FIGS. 10A-10C and 11A-11B, without being described in the paragraphs that describe these figures. Thus, the method 100 for the transmission 210 of FIGS. 10A-10C may include using the control system 200 illustrated in FIG. 7C to determine a desired pressure to apply to the first clutch 228. In addition, by way of example, the method 100 may include braking the output member 222 by using the vehicle braking system, or braking the output member 222 with one or more of the torque transmitting mechanisms, as described above.

As above, each of the active clutches and/or steady state applied clutches in the FIGS. 11A-11B may have pressure applied to them such that they are partially engaged, or they may be fully engaged or locked, as desired.

In addition, while the method 100 is illustrated for use with transmissions illustrated in FIGS. 1A-1C, 8A-8C, and 10A-10C, the method 100 described herein could be used with any other suitable transmission. The description of the invention is merely exemplary in nature and variations that do not depart from the gist of the invention are intended to be within the scope of the invention. Such variations are not to be regarded as a departure from the spirit and scope of the invention.

What is claimed is:

1. A method for shifting a transmission of a motor vehicle, the transmission having a plurality of planetary gear sets, each of the planetary gear sets having first, second, and third members, the method comprising shifting into first gear from one of a reverse gear and neutral, the motor vehicle operable to be propelled in a forward direction in first gear and in a rearward direction in the reverse gear, the method comprising the following steps:
   applying a torque transmitting mechanism to interconnect a first member of the plurality of planetary gear sets with another of the first, second, and third members or a stationary member, wherein when the motor vehicle is being propelled in first gear or the reverse gear, the torque transmitting mechanism is not applied;
   after the torque transmitting mechanism is applied, applying a high gain clutch to interconnect a second member of the plurality of planetary gear sets with another of the first, second, and third members or the stationary member, the high gain clutch being one of a dog clutch and a band clutch; and
   after the high gain clutch is applied, releasing the torque transmitting mechanism.

2. The method according to claim 1, wherein the first and second members are provided as elements of a first planetary gear set of the plurality of planetary gear sets.

3. The method according to claim 1, wherein the first member is provided as a member of a second planetary gear set of the plurality of planetary gear sets and the second member is provided as a member of a first planetary gear set of the plurality of planetary gear sets.

4. The method according to claim 3, wherein the torque transmitting mechanism is provided as a first clutch and the step of applying the torque transmitting mechanism includes interconnecting the first member of the second planetary gear set with a third member of the second planetary gear set and an input member; and wherein the high gain clutch is provided as a first brake and the step of applying the high gain clutch includes interconnecting the second member of the first planetary gear set with the stationary member, the method further comprising:
   applying a third torque transmitting mechanism prior to applying the first brake to shift from a reverse gear ratio to a forward gear ratio, the step of applying the high gain clutch including applying the first brake while the third torque transmitting mechanism is applied; and
   after the step of applying the high gain clutch, releasing the third torque transmitting mechanism.

5. The method according to claim 4, wherein the step of applying the third torque transmitting mechanism includes interconnecting a first member of a fourth planetary gear set of the plurality of planetary gear sets to the stationary member.

6. The method according to claim 5, further comprising applying a fourth torque transmitting mechanism to interconnect a second member of the fourth planetary gear set, a second member of a third planetary gear set of the plurality of planetary gears, and the first member of the second planetary gear set with the stationary member during the steps of applying the first brake, the first clutch, and the third torque transmitting mechanism and the steps of releasing the first clutch and the third torque transmitting mechanism.

7. The method according to claim 3, wherein the torque transmitting mechanism is provided as a first clutch and the step of applying the torque transmitting mechanism includes interconnecting the first member of the second planetary gear set with a third member of the second planetary gear set and an input member; and wherein the high gain clutch is provided as a first brake and the step of applying the high gain clutch includes interconnecting the second member of the first planetary gear set with the stationary member, the method further comprising braking the motor vehicle prior to applying the first brake.

8. The method according to claim 7, wherein the step of braking the motor vehicle prior to applying the first brake includes sending a signal to a vehicle braking system to cause the vehicle braking system to automatically brake the motor vehicle.

9. The method according to claim 3, wherein the torque transmitting mechanism is provided as a first clutch and the step of applying the torque transmitting mechanism includes interconnecting the first member of the second planetary gear set with a third member of the second planetary gear set and an input member; and wherein the high gain clutch is provided as a first brake and the step of applying the high gain clutch includes interconnecting the second member of the first planetary gear set with the stationary member, the method further comprising providing:
 a first interconnecting member continuously interconnecting a first member of the first planetary gear set with a third member of a third planetary gear set of the plurality of planetary gear sets, a third member of a fourth planetary gear set of the plurality of planetary gear sets, and an output member;
 a second interconnecting member continuously interconnecting a third member of the first planetary gear set with a second member of the second planetary gear set;
 a third interconnecting member continuously interconnecting the first member of the second planetary gear set with a second member of the third planetary gear set and a second member of the fourth planetary gear set; and
 a second clutch, a third clutch, a second brake, a third brake, and a fourth brake, wherein the first, second, third and fourth brakes and the first, second, and third clutches are each selectively engageable to interconnect at least one of the first, second, and third members with at least one other of the first, second, third members and the stationary member,
 wherein the first, second, third, and fourth brakes and the first, second, and third clutches are selectively engageable in combinations of at least two to establish at least nine forward speed ratios and at least one reverse speed ratio between the input member and the output member.

10. The method according to claim 9, further comprising:
 providing the second clutch as being selectively engageable to interconnect the first member of the third planetary gear set with the third member of the second planetary gear set and the input member;
 providing the third clutch as being selectively engageable to interconnect the third member of the fourth planetary gear set, the third member of the third planetary gear set, the first member of the first planetary gear set, and the output member with the second member of the third planetary gear set, the second member of the fourth planetary gear set, and the first member of the second planetary gear set;
 providing the second brake as being selectively engageable to interconnect the first member of the fourth planetary gear set with the stationary member;
 providing the third brake as being selectively engageable to interconnect the first member of the second planetary gear set and the second members of the third and fourth planetary gear sets with the stationary member; and
 providing the fourth brake as being selectively engageable to interconnect the first member of the third planetary gear set with the stationary member,
 wherein the first members of the third and fourth planetary gear sets, the second member of the first planetary gear set, and the third member of the second planetary gear set are provided as sun gear members; wherein the second members of the second, third, and fourth planetary gear sets and the first member of the first planetary gear set are provided as planetary gear carrier members; and wherein the first member of the second planetary gear set and the third members of the first, third, and fourth planetary gear sets are provided as ring gear members.

11. The method according to claim 3, wherein the torque transmitting mechanism is provided as a first clutch and the step of applying the torque transmitting mechanism includes interconnecting the first member of the second planetary gear set with a third member of the second planetary gear set and an input member; and wherein the high gain clutch is provided as a first brake and the step of applying the high gain clutch includes interconnecting the second member of the first planetary gear set with the stationary member, the method further comprising providing:
 a first interconnecting member continuously interconnecting a first member of the first planetary gear set with a third member of a third planetary gear set of the plurality of planetary gear sets and an output member;
 a second interconnecting member continuously interconnecting a third member of the first planetary gear set with a second member of the second planetary gear set;
 a third interconnecting member continuously interconnecting the first member of the second planetary gear set with a second member of the third planetary gear set and a second member of a fourth planetary gear set of the plurality of planetary gear sets;
 a fourth interconnecting member continuously interconnecting a first member of the third planetary gear set with a first member of the fourth planetary gear set; and
 a second clutch, a third clutch, a second brake, a third brake, and a fourth brake, wherein the first, second, third and fourth brakes and the first, second, and third clutches are each selectively engageable to interconnect at least one of the first, second, and third members with at least one other of the first, second, third members and the stationary member,
 wherein the first, second, third, and fourth brakes and the first, second, and third clutches are selectively engageable in combinations of at least two to establish at least ten forward speed ratios and at least one reverse speed ratio between the input member and the output member.

12. The method according to claim 11, further comprising:
providing the second clutch as being selectively engageable to interconnect the first members of the third and fourth planetary gear sets with the third member of the second planetary gear set and the input member;
providing the third clutch as being selectively engageable to interconnect the third member of the third planetary gear set, the first member of the first planetary gear set, and the output member with the second member of the fourth planetary gear set, the second member of the third planetary gear set, and the first member of the second planetary gear set;
providing the second brake as being selectively engageable to interconnect the first members of the third and fourth planetary gear sets with the stationary member;
providing the third brake as being selectively engageable to interconnect the first member of the second planetary gear set and the second members of the third and fourth planetary gear sets with the stationary member; and
providing the fourth brake as being selectively engageable to interconnect a third member of the fourth planetary gear set with the stationary member,
wherein the first member of the third planetary gear set, the second member of the first planetary gear set, and the third members of the second and fourth planetary gear sets are provided as sun gear members; wherein the second members of the second and third planetary gear sets and the first members of the first and fourth planetary gear sets are provided as planetary gear carrier members; and wherein the first member of the second planetary gear set, the second member of the fourth planetary gear set, and the third members of the first and third planetary gear sets are provided as ring gear members.

13. A method for shifting a transmission of a motor vehicle, the transmission having a plurality of planetary gear sets, each of the planetary gear sets having first, second, and third members, the method comprising:
applying a torque transmitting mechanism to interconnect a first member of the plurality of planetary gear sets with another of the first, second, and third members or a stationary member;
after the torque transmitting mechanism is applied, applying a high gain clutch to interconnect a second member of the plurality of planetary gear sets with another of the first, second, and third members or the stationary member, the high gain clutch being one of a dog clutch and a band clutch; and
after the high gain clutch is applied, releasing the torque transmitting mechanism,
wherein the first and second members are provided as elements of a first planetary gear set of the plurality of planetary gear sets, and
wherein the torque transmitting mechanism is provided as a first brake and the step of applying the torque transmitting mechanism includes interconnecting the first member of the first planetary gear set with the stationary member; and wherein the high gain clutch is provided as a second brake and the step of applying the high gain clutch includes interconnecting the second member of the first planetary gear set with the stationary member, the method further comprising:
applying a third brake prior to the step of applying the high gain clutch; and
after the step of applying the high gain clutch, releasing the third brake.

14. The method according to claim 13, wherein the step of applying the third brake includes interconnecting a first member of a third planetary gear set of the plurality of planetary gear sets with the stationary member.

15. The method according to claim 14, further comprising applying a fourth brake during the steps of applying the first, second, and third brakes and the steps of releasing the first and third brakes.

16. A method for shifting a transmission of a motor vehicle, the transmission having a plurality of planetary gear sets, each of the planetary gear sets having first, second, and third members, the method comprising:
applying a torque transmitting mechanism to interconnect a first member of the plurality of planetary gear sets with another of the first, second, and third members or a stationary member;
after the torque transmitting mechanism is applied, applying a high gain clutch to interconnect a second member of the plurality of planetary gear sets with another of the first, second, and third members or the stationary member, the high gain clutch being one of a dog clutch and a band clutch; and
after the high gain clutch is applied, releasing the torque transmitting mechanism,
wherein the first and second members are provided as elements of a first planetary gear set of the plurality of planetary gear sets, and
wherein the torque transmitting mechanism is provided as a first brake and the step of applying the torque transmitting mechanism includes interconnecting the first member of the first planetary gear set with the stationary member; and wherein the high gain clutch is provided as a second brake and the step of applying the high gain clutch includes interconnecting the second member of the first planetary gear set with the stationary member, the method further comprising braking the motor vehicle prior to applying the second brake.

17. The method according to claim 16, wherein the step of braking the motor vehicle prior to applying the second brake includes sending a signal to a vehicle braking system to cause the vehicle braking system to automatically brake the motor vehicle.

18. A method for shifting a transmission of a motor vehicle, the transmission having a plurality of planetary gear sets, each of the planetary gear sets having first, second, and third members, the method comprising:
applying a torque transmitting mechanism to interconnect a first member of the plurality of planetary gear sets with another of the first, second, and third members or a stationary member;
after the torque transmitting mechanism is applied, applying a high gain clutch to interconnect a second member of the plurality of planetary gear sets with another of the first, second, and third members or the stationary member, the high gain clutch being one of a dog clutch and a band clutch; and
after the high gain clutch is applied, releasing the torque transmitting mechanism,
wherein the first and second members are provided as elements of a first planetary gear set of the plurality of planetary gear sets, and
wherein the torque transmitting mechanism is provided as a first brake and the step of applying the torque transmitting mechanism includes interconnecting the first member of the first planetary gear set with the stationary member; and wherein the high gain clutch is provided as a second brake and the step of applying the high gain clutch includes interconnecting the second member of the first planetary gear set with the stationary member, the method further comprising providing:
an input member;
an output member;
a first interconnecting member continuously interconnecting a first member of a fourth planetary gear set of the plurality of planetary gear sets with a second member of a second planetary gear set of the plurality of planetary gear sets;
a second interconnecting member continuously interconnecting a second member of the fourth planetary gear set with a third member of a third planetary gear set of the plurality of planetary gear sets;
a third interconnecting member continuously interconnecting a third member of the fourth planetary gear set with the second member of the first planetary gear set;
a fourth interconnecting member continuously interconnecting a first member of the second planetary gear set with a third member of the first planetary gear set;
a fifth interconnecting member continuously interconnecting a third member of the second planetary gear set with a second member of the third planetary gear set; and
a first clutch, a second clutch, a third brake, and a fourth brake, wherein the first, second, third and fourth brakes and the first and second clutches are each selectively engageable to interconnect at least one of the first, second, and third members with at least one other of the first, second, third members and the stationary member, wherein the first, second, third, and fourth brakes and the first and second clutches are selectively engageable in combinations of at least two to establish at least ten forward speed ratios and at least one reverse speed ratio between the input member and the output member.

19. The method according to claim 18, further comprising:
providing the first clutch as being selectively engageable to interconnect a first member of the third planetary gear set with the first member of the second planetary gear set, the third member of the first planetary gear set, and the input member;
providing the second clutch as being selectively engageable to interconnect the third member of the second planetary gear set and the second member of the third planetary gear set with the input member, the first member of the second planetary gear set, and the third member of the first planetary gear set;
providing the third brake as being selectively engageable to interconnect the first member of the third planetary gear set with the stationary member; and
providing the fourth brake as being selectively engageable to interconnect the second member of the third planetary gear set and the third member of the second planetary gear set with the stationary member, wherein the third member of the fourth planetary gear set, the second member of the first planetary gear set, the first members of the second and third planetary gear sets are provided as sun gear members;
wherein the second members of the second, third and fourth planetary gear sets and the third member of the first planetary gear set are provided as planetary gear carrier members; and wherein the first members of the first and fourth planetary gear sets and the third members of the second and third planetary gear sets are provided as ring gear members.

20. A method for shifting a transmission of a motor vehicle, the transmission having a plurality of planetary gear sets, each of the planetary gear sets having first, second, and third members, the method comprising:
applying a torque transmitting mechanism to interconnect a first member of the plurality of planetary gear sets with another of the first, second, and third members or a stationary member;
after the torque transmitting mechanism is applied, applying a high gain clutch to interconnect a second member of the plurality of planetary gear sets with another of the first, second, and third members or the stationary member, the high gain clutch being one of a dog clutch and a band clutch:
after the high gain clutch is applied, releasing the torque transmitting mechanism;
determining an actual speed of the second member;
comparing an absolute value of the actual speed of the second member to a predetermined upper threshold;
if the absolute value of the actual speed of the second member exceeds the predetermined upper threshold, adjusting fluid pressure applied to the torque transmitting mechanism; and
if the absolute value of the actual speed of the second member is less than or equal to the predetermined upper threshold, executing the step of applying the high gain clutch.

21. The method according to claim 20, further comprising repeating the step of determining the actual speed of the second member, the step of comparing the absolute value of the actual speed of the second member to the predetermined upper threshold, and the step of adjusting the fluid pressure applied to the torque transmitting mechanism until the absolute value of the actual speed of the second member drops below or equals the predetermined upper threshold.

22. The method according to claim 21, further comprising:
providing the actual speed of the second member to a PID controller; and
providing the predetermined upper threshold to the PID controller,
wherein the step of adjusting the fluid pressure applied to the torque transmitting mechanism includes choosing a desired fluid pressure to apply to the torque transmitting mechanism based on an estimated desired fluid pressure determined by the PID controller.

23. A method for shifting a transmission having a plurality of planetary gear sets, each of the planetary gear sets having first, second, and third members, the method comprising:
applying a torque transmitting mechanism to interconnect a first member of the plurality of planetary gear sets with another of the first, second, and third members or a stationary member;
determining an actual speed of a second member of the plurality of planetary gear sets;
comparing an absolute value of the actual speed of the second member to a predetermined upper threshold;
if the absolute value of the actual speed of the second member exceeds the predetermined upper threshold, adjusting fluid pressure applied to the torque transmitting mechanism;
repeating the step of determining the actual speed of the second member, the step of comparing the absolute value of the actual speed of the second member to the predetermined upper threshold, and the step of adjusting the fluid pressure applied to the torque transmitting mechanism until the absolute value of the actual speed of the second member drops below or equals the predetermined upper threshold;

if the absolute value of the actual speed of the second member is less than or equal to the predetermined upper threshold, applying a high gain clutch to interconnect the second member with another of the first, second, and third members or the stationary member while the torque transmitting mechanism is applied, the high gain clutch being one of a dog clutch and a band clutch; and after the high gain clutch is applied, releasing the torque transmitting mechanism.

24. The method according to claim 23, further comprising:

providing the actual speed of the second member to a PID controller; and providing the predetermined upper threshold to the PID controller, wherein the step of adjusting the fluid pressure applied to the torque transmitting mechanism includes choosing a desired fluid pressure for the torque transmitting mechanism based on an estimated desired fluid pressure determined by the PID controller.

* * * * *